(12) United States Patent
Hansson et al.

(10) Patent No.: US 11,585,901 B2
(45) Date of Patent: Feb. 21, 2023

(54) SCANNING LIDAR SYSTEM AND METHOD WITH SPATIAL FILTERING FOR REDUCTION OF AMBIENT LIGHT

(71) Applicant: Veoneer US, LLC, Southfield, MI (US)

(72) Inventors: Peter Hansson, Southfield, MI (US); Emil Hallstig, Southfield, MI (US); Bernard De Mersseman, Southfield, MI (US)

(73) Assignee: VEONEER US, LLC, Wilmington, DE (US)

( * ) Notice: Subject to any disclaimer, the term of this patent is extended or adjusted under 35 U.S.C. 154(b) by 930 days.

(21) Appl. No.: 16/105,135

(22) Filed: Aug. 20, 2018

(65) Prior Publication Data

US 2019/0146064 A1     May 16, 2019

Related U.S. Application Data

(63) Continuation-in-part of application No. 15/813,404, filed on Nov. 15, 2017, now Pat. No. 10,838,043.
(Continued)

(51) Int. Cl.
*G01S 7/00* (2006.01)
*G01S 7/481* (2006.01)
(Continued)

(52) U.S. Cl.
CPC .......... *G01S 7/4812* (2013.01); *G01S 7/4815* (2013.01); *G01S 7/4816* (2013.01); *G01S 7/4817* (2013.01);
(Continued)

(58) Field of Classification Search
USPC ....................................................... 356/5.01
See application file for complete search history.

(56) References Cited

U.S. PATENT DOCUMENTS 3,712,985 A   1/1973   Swarner et al.
3,898,656 A   8/1975   Jensen
(Continued)

FOREIGN PATENT DOCUMENTS

AT     509180 B1    1/2016
DE   19757840 C1    9/1999
(Continued)

OTHER PUBLICATIONS

International Search Report and Written Opinion for International Application No. PCT/US2020/064474, dated Apr. 1, 2021.
(Continued)

*Primary Examiner* — James R Hulka
(74) *Attorney, Agent, or Firm* — Burns & Levinson LLP; Steven M. Mills

(57) ABSTRACT

According to one aspect, an optical transceiver includes a substrate and a laser fixed to a first surface of the substrate, the laser generating output light for transmission along a transmission axis into a region. An optical detection element is fixed to a second surface of the substrate opposite the first surface, the optical detection element receiving input light reflected from the region along a reception axis through an opening in the substrate between the first and second surfaces of the substrate, the transmission axis and the reception axis being substantially parallel.

24 Claims, 19 Drawing Sheets

Related U.S. Application Data

(60) Provisional application No. 62/623,589, filed on Jan. 30, 2018.

(51) Int. Cl.
*G01S 7/4863* (2020.01)
*G01S 7/499* (2006.01)
*G01S 7/487* (2006.01)
*G01S 17/931* (2020.01)

(52) U.S. Cl.
CPC .......... *G01S 7/4863* (2013.01); *G01S 7/4876* (2013.01); *G01S 7/499* (2013.01); *G01S 17/931* (2020.01)

(56) References Cited

U.S. PATENT DOCUMENTS

| | | | |
|---|---|---|---|
| 4,125,864 A | 11/1978 | Aughton | |
| 4,184,154 A | 1/1980 | Albanese et al. | |
| 4,362,361 A | 12/1982 | Campbell et al. | |
| 4,439,766 A | 3/1984 | Kobayashi et al. | |
| 4,765,715 A | 8/1988 | Matsudaira et al. | |
| 4,957,362 A | 9/1990 | Peterson | |
| 5,200,606 A | 4/1993 | Krasutsky et al. | |
| 5,210,586 A | 5/1993 | Grage et al. | |
| 5,274,379 A | 12/1993 | Carbonneau | |
| 5,428,215 A | 6/1995 | Dubois et al. | |
| 5,604,695 A | 2/1997 | Cantin et al. | |
| 5,793,491 A | 8/1998 | Wangler et al. | |
| 5,889,490 A | 3/1999 | Wachter et al. | |
| 5,966,226 A | 10/1999 | Gerber | |
| 6,072,607 A * | 6/2000 | Tajiri | G02B 27/1006 359/15 |
| 6,078,395 A | 6/2000 | Jourdain et al. | |
| 6,122,222 A | 9/2000 | Hossack | |
| 6,242,760 B1 * | 6/2001 | Hamaguchi | G11B 7/123 257/433 |
| 6,292,285 B1 | 9/2001 | Wang et al. | |
| 6,384,770 B1 | 5/2002 | De Gouy | |
| 6,437,854 B2 | 8/2002 | Hahlweg | |
| 6,556,282 B2 | 4/2003 | Jamieson et al. | |
| 6,559,932 B1 | 5/2003 | Halmos | |
| 7,202,941 B2 | 4/2007 | Munro | |
| 7,227,116 B2 | 6/2007 | Gleckler | |
| 7,272,271 B2 | 9/2007 | Kaplan et al. | |
| 7,440,084 B2 | 10/2008 | Kane | |
| 7,483,600 B2 | 1/2009 | Achiam et al. | |
| 7,489,865 B2 | 2/2009 | Varshneya et al. | |
| 7,544,945 B2 | 6/2009 | Tan et al. | |
| 7,570,347 B2 | 8/2009 | Ruff et al. | |
| 7,675,610 B2 | 3/2010 | Redman et al. | |
| 7,832,762 B2 | 11/2010 | Breed | |
| 8,044,999 B2 | 10/2011 | Mullen et al. | |
| 8,050,863 B2 | 11/2011 | Trepagnier et al. | |
| 8,134,637 B2 | 3/2012 | Rossbach et al. | |
| 8,223,215 B2 | 7/2012 | Oggier et al. | |
| 8,363,511 B2 | 1/2013 | Frank et al. | |
| 8,508,723 B2 | 8/2013 | Chang et al. | |
| 8,629,975 B1 | 1/2014 | Dierking et al. | |
| 8,742,325 B1 | 6/2014 | Droz et al. | |
| 8,836,761 B2 | 9/2014 | Wang et al. | |
| 8,836,922 B1 | 9/2014 | Pennecot | |
| 8,879,050 B2 | 11/2014 | Ko | |
| 9,007,569 B2 | 4/2015 | Amzajerdian et al. | |
| 9,063,549 B1 | 6/2015 | Pennecot et al. | |
| 9,086,273 B1 | 7/2015 | Gruver et al. | |
| 9,090,213 B2 | 7/2015 | Lawlor et al. | |
| 9,097,646 B1 | 8/2015 | Campbell et al. | |
| 9,140,792 B2 | 9/2015 | Zeng | |
| 9,157,790 B2 | 10/2015 | Shpunt et al. | |
| 9,267,787 B2 | 2/2016 | Shpunt et al. | |
| 9,285,477 B1 | 3/2016 | Smith et al. | |
| 9,516,152 B2 * | 12/2016 | Rudmann | H01L 27/14687 |
| 9,575,162 B2 | 2/2017 | Owechko | |
| 9,618,742 B1 | 4/2017 | Droz et al. | |
| 9,651,417 B2 | 5/2017 | Shpunt et al. | |
| 9,658,322 B2 | 5/2017 | Lewis | |
| 9,696,427 B2 | 7/2017 | Wilson et al. | |
| 9,711,493 B2 | 7/2017 | Lin | |
| 9,753,351 B2 | 9/2017 | Eldada | |
| 9,823,351 B2 | 11/2017 | Haslim et al. | |
| 9,857,472 B2 | 1/2018 | Mheen et al. | |
| 9,869,754 B1 | 1/2018 | Campbell et al. | |
| 10,018,725 B2 | 7/2018 | Liu | |
| 10,018,726 B2 | 7/2018 | Hall et al. | |
| 10,024,655 B2 | 7/2018 | Raguin et al. | |
| 10,078,133 B2 | 9/2018 | Dussan | |
| 10,088,557 B2 | 10/2018 | Yeun | |
| 10,148,060 B2 | 12/2018 | Hong et al. | |
| 10,175,360 B2 | 1/2019 | Zweigle et al. | |
| 10,183,541 B2 | 1/2019 | Van Den Bossche et al. | |
| 10,408,924 B2 | 9/2019 | Mheen | |
| 10,411,524 B2 | 9/2019 | Widmer et al. | |
| 10,416,292 B2 | 9/2019 | de Mersseman et al. | |
| 10,473,767 B2 | 11/2019 | Xiang et al. | |
| 10,473,784 B2 | 11/2019 | Puglia | |
| 10,473,943 B1 | 11/2019 | Hughes | |
| 10,551,501 B1 | 2/2020 | LaChapelle | |
| 10,557,923 B2 | 2/2020 | Watnik et al. | |
| 10,558,044 B2 | 2/2020 | Pan | |
| 10,564,268 B2 | 2/2020 | Turbide et al. | |
| 10,578,724 B2 | 3/2020 | Droz et al. | |
| 10,627,493 B2 * | 4/2020 | Morikawa | G01S 7/4816 |
| 10,678,117 B2 | 6/2020 | Shin et al. | |
| 10,775,508 B1 | 9/2020 | Rezk et al. | |
| 10,937,773 B2 * | 3/2021 | T'Ng | G01J 3/108 |
| 2001/0052872 A1 | 12/2001 | Hahlweg | |
| 2003/0043363 A1 | 3/2003 | Jamieson | |
| 2004/0028418 A1 | 2/2004 | Kaplan et al. | |
| 2004/0031906 A1 * | 2/2004 | Decker | G01J 3/2823 250/208.1 |
| 2004/0135992 A1 | 7/2004 | Munro | |
| 2004/0155249 A1 * | 8/2004 | Narui | H01L 31/173 257/79 |
| 2005/0219506 A1 | 10/2005 | Okuda et al. | |
| 2006/0221250 A1 | 10/2006 | Rossbach et al. | |
| 2006/0232052 A1 | 10/2006 | Breed | |
| 2006/0239312 A1 * | 10/2006 | Kewitsch | H01S 5/42 372/29.023 |
| 2007/0140613 A1 | 6/2007 | Achiam et al. | |
| 2007/0181810 A1 | 8/2007 | Tan et al. | |
| 2007/0211786 A1 | 9/2007 | Shatill | |
| 2007/0219720 A1 | 9/2007 | Trepagnier et al. | |
| 2008/0088499 A1 | 4/2008 | Bonthron et al. | |
| 2008/0095121 A1 | 4/2008 | Shatill | |
| 2008/0100510 A1 | 5/2008 | Bonthron | |
| 2008/0219584 A1 | 9/2008 | Mullen et al. | |
| 2008/0246944 A1 | 10/2008 | Redman et al. | |
| 2009/0002680 A1 | 1/2009 | Ruff et al. | |
| 2009/0010644 A1 | 1/2009 | Varshneya | |
| 2009/0190007 A1 | 7/2009 | Oggier | |
| 2009/0251361 A1 | 10/2009 | Bensley | |
| 2010/0027602 A1 | 2/2010 | Abshire et al. | |
| 2010/0128109 A1 | 5/2010 | Banks | |
| 2010/0157280 A1 | 6/2010 | Kusevic et al. | |
| 2010/0182874 A1 | 7/2010 | Frank et al. | |
| 2012/0075422 A1 | 3/2012 | Wang et al. | |
| 2012/0182540 A1 | 7/2012 | Suzuki | |
| 2012/0206712 A1 | 8/2012 | Chang et al. | |
| 2012/0236379 A1 | 9/2012 | da Silva et al. | |
| 2012/0310516 A1 | 12/2012 | Zeng | |
| 2012/0310519 A1 | 12/2012 | Lawlor et al. | |
| 2013/0088726 A1 | 4/2013 | Goyal et al. | |
| 2013/0093584 A1 | 4/2013 | Schumacher | |
| 2013/0120760 A1 * | 5/2013 | Raguin | G06K 9/0004 356/612 |
| 2013/0166113 A1 | 6/2013 | Dakin et al. | |
| 2013/0206967 A1 * | 8/2013 | Shpunt | G01S 17/10 250/216 |
| 2013/0207970 A1 | 8/2013 | Shpunt et al. | |
| 2013/0222786 A1 | 8/2013 | Hanson et al. | |
| 2013/0250276 A1 | 9/2013 | Chang et al. | |
| 2014/0036252 A1 | 2/2014 | Amzajerdian et al. | |

(56) References Cited

U.S. PATENT DOCUMENTS

| | | |
|---|---|---|
| 2014/0049609 A1 | 2/2014 | Wilson |
| 2014/0152975 A1 | 6/2014 | Ko |
| 2014/0168631 A1 | 6/2014 | Haslim et al. |
| 2014/0233942 A1 | 8/2014 | Kanter |
| 2014/0313519 A1 | 10/2014 | Shpunt et al. |
| 2015/0009485 A1 | 1/2015 | Mheen |
| 2015/0055117 A1 | 2/2015 | Pennecot et al. |
| 2015/0234308 A1* | 8/2015 | Lim .................. B41J 2/471 |
| | | 399/51 |
| 2015/0260843 A1 | 9/2015 | Lewis |
| 2015/0301162 A1 | 10/2015 | Kim |
| 2015/0371074 A1* | 12/2015 | Lin ................. H01L 25/167 |
| | | 382/124 |
| 2015/0378011 A1 | 12/2015 | Owechko |
| 2016/0047895 A1 | 2/2016 | Dussan |
| 2016/0047896 A1 | 2/2016 | Dussan |
| 2016/0047903 A1 | 2/2016 | Dussan |
| 2016/0138944 A1* | 5/2016 | Lee ................... G06F 3/041 |
| | | 250/227.11 |
| 2016/0178749 A1 | 6/2016 | Lin et al. |
| 2016/0200161 A1 | 7/2016 | Van Den Bossche et al. |
| 2016/0245902 A1 | 8/2016 | Watnik et al. |
| 2016/0280229 A1 | 9/2016 | Kasahara |
| 2016/0291160 A1 | 10/2016 | Zweigle et al. |
| 2016/0357187 A1 | 12/2016 | Ansari |
| 2016/0363669 A1* | 12/2016 | Liu .................. G01S 7/4812 |
| 2016/0380488 A1 | 12/2016 | Widmer |
| 2017/0023678 A1 | 1/2017 | Pink et al. |
| 2017/0090013 A1 | 3/2017 | Paradie et al. |
| 2017/0102457 A1 | 4/2017 | Li |
| 2017/0199273 A1* | 7/2017 | Morikawa ............ G01S 17/42 |
| 2017/0219696 A1 | 8/2017 | Hayakawa et al. |
| 2017/0269215 A1 | 9/2017 | Hall et al. |
| 2017/0270381 A1 | 9/2017 | Itoh et al. |
| 2017/0285346 A1 | 10/2017 | Pan |
| 2017/0307736 A1 | 10/2017 | Donovan |
| 2017/0307737 A1 | 10/2017 | Ishikawa et al. |
| 2017/0310948 A1 | 10/2017 | Pei |
| 2017/0329010 A1 | 11/2017 | Warke et al. |
| 2017/0329011 A1 | 11/2017 | Warke et al. |
| 2017/0370676 A1* | 12/2017 | Volfson ................ F41G 3/06 |
| 2018/0052378 A1 | 2/2018 | Shin et al. |
| 2018/0113193 A1 | 4/2018 | Huemer |
| 2018/0128903 A1* | 5/2018 | Chang ................ G01S 17/10 |
| 2018/0136328 A1 | 5/2018 | Moss |
| 2018/0143309 A1 | 5/2018 | Pennecot et al. |
| 2018/0180718 A1* | 6/2018 | Lin ................... G01S 7/4813 |
| 2018/0224529 A1 | 8/2018 | Wolf et al. |
| 2018/0241477 A1 | 8/2018 | Turbide et al. |
| 2018/0275275 A1 | 9/2018 | Lundquist |
| 2018/0284237 A1 | 10/2018 | Campbell |
| 2018/0284282 A1* | 10/2018 | Hong ............... G02B 26/0891 |
| 2018/0284286 A1 | 10/2018 | Eichenholz |
| 2018/0286909 A1 | 10/2018 | Eichenholz et al. |
| 2018/0306913 A1 | 10/2018 | Bartels |
| 2018/0341009 A1* | 11/2018 | Niclass .............. G01S 7/4815 |
| 2018/0364334 A1* | 12/2018 | Xiang ................ G01S 17/42 |
| 2018/0372870 A1 | 12/2018 | Puglia |
| 2019/0018143 A1 | 1/2019 | Thayer et al. |
| 2019/0101644 A1* | 4/2019 | DeMersseman ........ G01S 17/10 |
| 2019/0123508 A1* | 4/2019 | Hong ................. G01S 7/4817 |
| 2019/0129009 A1 | 5/2019 | Eichenholz et al. |
| 2019/0137665 A1* | 5/2019 | You .................. G02B 5/1809 |
| 2019/0139951 A1* | 5/2019 | T'Ng .................. G01S 7/4813 |
| 2019/0146060 A1 | 5/2019 | Qiu et al. |
| 2019/0195990 A1 | 6/2019 | Shand |
| 2019/0221988 A1 | 7/2019 | Villeneuve et al. |
| 2019/0235064 A1 | 8/2019 | Droz et al. |
| 2020/0081129 A1 | 3/2020 | de Mersseman |
| 2020/0088847 A1 | 3/2020 | DeMersseman et al. |
| 2020/0249354 A1 | 8/2020 | Yeruhami et al. |
| 2020/0341120 A1 | 10/2020 | Ahn |
| 2020/0341121 A1 | 10/2020 | Ahn |
| 2021/0018602 A1 | 1/2021 | de Mersseman et al. |

FOREIGN PATENT DOCUMENTS

| | | | |
|---|---|---|---|
| DE | 102004033944 A1 | 2/2006 | |
| DE | 102006031114 A1 | 1/2008 | |
| DE | 102008045387 A1 | 3/2010 | |
| DE | 102014218957 A1 | 3/2016 | |
| DE | 102015217908 A1 | 3/2017 | |
| EP | 0112188 A2 | 6/1984 | |
| EP | 0578129 A2 | 1/1994 | |
| EP | 2124069 A1 | 11/2009 | |
| EP | 2696166 A2 | 2/2014 | |
| EP | 2824418 A1 | 1/2015 | |
| EP | 3147685 A1 | 3/2017 | |
| EP | 3203259 A1 | 8/2017 | |
| EP | 3457080 A1 | 3/2019 | |
| WO | 1994019705 A1 | 9/1994 | |
| WO | 2008/008970 A2 | 1/2008 | |
| WO | 2015/014556 A2 | 2/2015 | |
| WO | 2016072483 A1 | 5/2016 | |
| WO | 2016/097409 A2 | 6/2016 | |
| WO | 2016204139 A1 | 12/2016 | |
| WO | 2019050643 A1 | 3/2019 | |
| WO | WO-2019050643 A1 * | 3/2019 | .......... G01S 7/4816 |
| WO | 2019099166 A1 | 5/2019 | |

OTHER PUBLICATIONS

International Search Report and Written Opinion for International Application No. PCT/US2018/057676, dated Jan. 23, 2019.
International Search Report and Written Opinion for International Application No. PCT/US2018/052849, dated May 3, 2019.
International Search Report and Written Opinion for International Application No. PCT/US2019/046800, dated Nov. 25, 2019.
International Search Report and Written Opinion in corresponding International Application No. PCT/US2018/057727, dated Jan. 28, 2019; 12 pages.
International Search Report and Written Opinion in corresponding International Application No. PCT/US2018/052837, dated Jan. 24, 2019; 13 pages.
Skolnik, M.I., Introduction to Radar Systems, 3rd Edition, pp. 45-48, McGraw-Hill, New York, NY 2001; 6 pages.
Range-Doppler image processing in linear FMCW Radar and FPGA Based Real-Time Implementation, Journal of Communication and Computer, vol. 6, No. 4, Apr. 2009.
Kasturi et al., UAV-Borne LiDAR with MEMS Mirror Based Scanning Capability; SPIE Defense and Commercial Sensing Conference 2016; Apr. 20, 2016; Baltimore, MD; 10 pages.
Internet URL: https://www.continental-automotive.com/en-gl/Passenger-Cars/Chassis-Safety/Advanced-Driver-Assistance-Systems/Cameras [retrieved on Dec. 20, 2018].
Internet URL: https://www.continental-automotive.com/en-gl/Passenger-Cars/Chassis-Safety/Advanced-Driver-Assistance-Systems/Cameras/Multi-Function-Camera-with-Lidar [retrieved on Dec. 20, 2018].
Roncat, Andreas, The Geometry of Airborne Laser Scanning in a Kinematical Framework, Oct. 19, 2016 [retrieved on Dec. 19, 2018] Retrieved from the Internet URL: https://www.researchgate.net/profile/Andreas_Roncat/publication/310843362_The_Geometry_of_Airborne_Laser_Scanning_in_a_Kinematical_Framework/links/5839add708ae3a74b49ea03b/The-Geometry-of-Airborne-Laser-Scanning-in-a-Kinematical-Framework.pdf.
Internet URL: http://www.advancedscientificconcepts.com/products/overview.html [retrieved on Dec. 20, 2018].
Hi-Res 3d Flash LIDAR will Supplement Continental's Existing Portfolio for Automated Driving [online], Press Release, Mar. 3, 2016, [retrieved on Dec. 20, 2018]. Retrieved from the Internet URL: https://www.continental-corporation.com/en/press/press-releases/hi-res-3d-flash-lidar-will-supplement-continental-s-existing-portfolio-for-automated-driving-15758.
A milestone for laser sensors in self-driving cars [online], Trade Press, Jul. 11, 2016, [retrieved on Dec. 19, 2018]. Retrieved from the Internet URL: https://www.osram.com/os/press/press-releases/a_milestone_for_laser_sensors_in_self-driving_cars.jsp.

(56) References Cited

OTHER PUBLICATIONS

Hewlett-Packard Application Note 77-4, Swept-Frequency Group Delay Measurements, Hewlett-Packard Co., Sep. 1968, 7 pages.
Kravitz et al., High-Resolution Low-Sidelobe Laser Ranging Based on Incoherent Pulse Compression, IEEE Photonics Technology Letters, vol. 24, No. 23, Dec. 1, 2012, pp. 2119-2121.
Journet et al., A Low-Cost Laser Range Finder Based on an FMCW-like Method, IEEE Transactions on Instrumentation and Measurement, Aug. 2000, vol. 49, No. 4, pp. 840-843.
Campbell et al., Advanced Sine Wave Modulation of Continuous Wave Laser System for Atmospheric CO2 Differential Absorption Measurements; NASA Langley Research Center; 32 pages [retrieved on Dec. 20, 2018].
Levanon et al., Non-coherent Pulse Compression—Aperiodic and Periodic Waveforms; The Institution of Engineering and Technology, 2015; 9 pages.
Peer et al., Compression Waveforms for Non-Coherent Radar, Tel Aviv University; 6 pages [retrieved on Dec. 20, 2018].
Li, Larry, Time-of-Flight Camera—An Introduction, Technical White Paper, SLOA190B, Texas Instruments; Jan. 2014; 10 pages.
Pierrottet et al., Linear FMCW Laser Radar for Precision Range and Vector Velocity Measurements, Coherent Applications, Inc.; NASA Langley Research Center; 9 pages [retrieved on Dec. 20, 2018].
Kahn, Joseph M., Modulation and Detection Techniques for Optical Communication Systems, Stanford University, Department of Electrical Engineering, 2006; 3 pages.
Niclass et al., Development of Automotive LIDAR, Electronics and Communications in Japan, vol. 98, No. 5, 2015; 6 pages.
International Search Report and Written Opinion in corresponding PCT Application No. PCT/US2017/033271, International Filing Date May 18, 2017; dated Sep. 1, 2017.
Su et al, 2-D FFT and Time-Frequency Analysis Techniques for Multi-Target Recognition of FMCW Radar Signal, Proceedings of the Asia-Pacific Microwave Conference 2011, pp. 1390-1393.
Wojtkiewicz et al, Two-Dimensional Signal Processing in FMCW Radars, Instytut Podstaw Elektroniki Politechnika Warszawska, Warszawa; 6 pages [retrieved on Dec. 20, 2018].
Winkler, Volker, Range Doppler Detection for Automotive FMCW Radars, Proceedings of the 4th European Radar Conference, Oct. 2007, Munich Germany; 4 pages.
Li et al., Investigation of Beam Steering Performances in Rotation Risley-Prism Scanner, Optics Express, Jun. 13, 2016, vol. 24, No. 12; 11 pages.
Thorlabs Application Note, Risley Prism Scanner; 33 pages [retrieved on Dec. 20, 2018].
Simpson et al., Intensity-Modulated, Stepped Frequency CW Lidar for Distributed Aerosol and Hard Target Measurements, Applied Optics, Nov. 20, 2005, vol. 44, No. 33, pp. 7210-7217.
International Search Report and Written Opinion in corresponding International Application No. PCT/US2017/033263, dated Aug. 29, 2017; 13 pages.
International Search Report and Written Opinion in corresponding International Application No. PCT/US2017/033265, dated Sep. 1, 2017; 15 pages.
International Search Report and Written Opinion in corresponding International Application No. PCT/US2018/054992, dated Dec. 11, 2018; 12 pages.
International Search Report and Written Opinion in corresponding International Application No. PCT/US2018/049038, dated Dec. 12, 2018; 13 pages.
Church et al., "Evaluation of a steerable 3D laser scanner using a double Risley prism pair," SPIE Paper.
Luhmann, "A historical review on panorama photogrammetry," http://www.researchgate.net/publication/228766550.
International Search Report and Written Opinion for International Application No. PCT/US2020/039760, dated Sep. 18, 2020.
International Search Report and Written Opinion in corresponding International Application No. PCT/US2018/048869, dated Nov. 8, 2018; 14 pages.
International Search Report and Written Opinion in corresponding International Application No. PCT/US2018/051281, dated Nov. 22, 2018; 14 pages.
Invitation to Pay Additional Fees dated Mar. 8, 2019 in PCT/US2018/052849.
Communication from EP Application No. 18773034.6 dated Sep. 13, 2021.

\* cited by examiner

Scan pattern

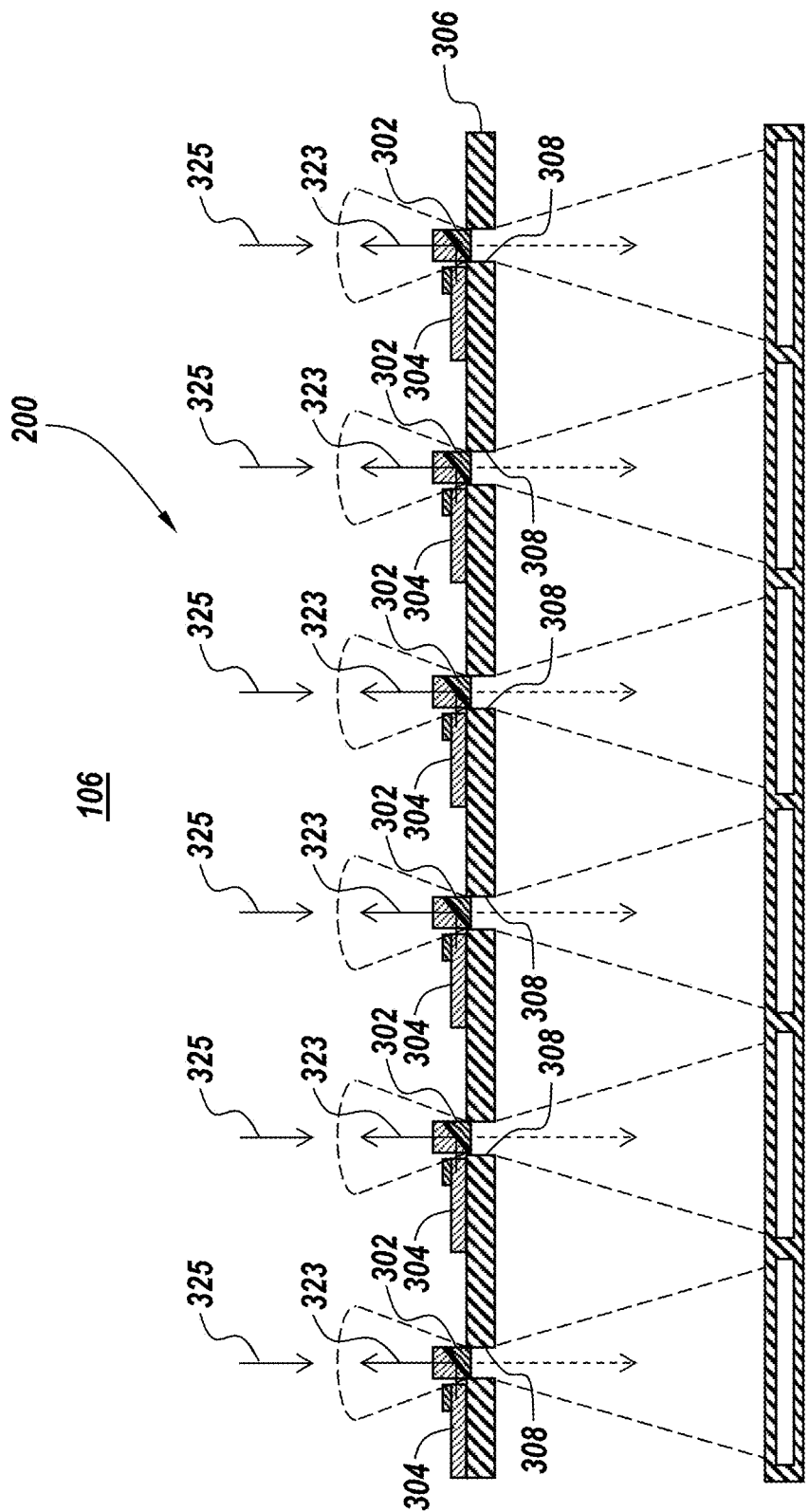

SCANNING LIDAR SYSTEM AND METHOD WITH SPATIAL FILTERING FOR REDUCTION OF AMBIENT LIGHT

RELATED APPLICATIONS

This application is a continuation-in-part of copending U.S. patent application Ser. No. 15/813,404, filed on Nov. 15, 2017, of the same Applicant as the present application, the entire contents of which are incorporated herein by reference.

This application relies for priority on U.S. Provisional Patent Application No. 62/623,589, filed on Jan. 30, 2018, of the same Applicant as the present application, the entire contents of which are incorporated herein by reference.

BACKGROUND

1. Technical Field

The present disclosure is related to LiDAR detection systems and, in particular, to a scanning LiDAR system and method with spatial filtering for reducing ambient light.

2. Discussion of Related Art

A typical LiDAR detection system includes a source of optical radiation, for example, a laser, which emits light into a region. An optical detection device, which can include one or more optical detectors and/or an array of optical detectors, receives reflected light from the region and converts the reflected light to electrical signals. A processing device processes the electrical signals to identify and generate information associated with one or more target objects in the region. This information can include, for example, bearing, range, velocity, and/or reflectivity information for each target object.

One very important application for LiDAR detection systems is in automobiles, in which object detections can facilitate various features, such as parking assistance features, cross traffic warning features, blind spot detection features, autonomous vehicle operation, and many other features. In automotive LiDAR detection systems, it is important to be able to detect both bright objects at close range and low-reflectivity objects at long range with the same system configuration.

SUMMARY

According to one aspect, an optical transceiver device is provided. The optical transceiver device includes a substrate and a laser fixed to a first surface of the substrate, the laser generating output light for transmission along a transmission axis into a region. An optical detection element is fixed to a second surface of the substrate opposite the first surface, the optical detection element receiving input light reflected from the region along a reception axis through an opening in the substrate between the first and second surfaces of the substrate, the transmission axis and the reception axis being substantially parallel.

In some exemplary embodiments, the transmission axis and the reception axis are substantially the same axis.

In some exemplary embodiments, the optical transceiver device further comprises a mask having at least one slit aligned with the opening of the substrate, such that the reflected light received by the detection element from the region passes through the slit. The mask can be formed at the first surface of the substrate. Alternatively, the mask can be formed at the second surface of the substrate.

In some exemplary embodiments, the optical transceiver device further comprises a bandpass filter, the light returning from the region impinging on the bandpass filter such that the light returning from the region is filtered by the bandpass filter. The bandpass filter can have a wavelength pass band which drifts with temperature, the bandpass filter being selected such that temperature drift of the pass band of the bandpass filter is determined according to temperature drift of a wavelength of the output light.

In some exemplary embodiments, the optical detection element comprises a silicon photomultiplier (SiPM) detector. In other exemplary embodiments, the optical detection element comprises a multi-pixel photon counter (MPPC) detector. In some exemplary embodiments, the optical transceiver device further comprises a mask having at least one slit aligned with the aperture of the substrate, such that the reflected light received by the detector from the region passes through the slit before it reaches the detector. The mask can be formed at the first surface of the substrate. Alternatively, the mask can be formed at the second surface of the substrate.

In some exemplary embodiments, the optical transceiver device further comprises a polarizing beam splitter in an optical path between the laser and the detector, both the output light and the input light at least partially passing through the polarizing beam splitter.

In some exemplary embodiments, the optical transceiver device further comprises a polarizing beam splitter in an optical path between the laser and the detector, at least one of the output light and the input light at least partially passing through the polarizing beam splitter.

In some exemplary embodiments, the optical transceiver device further comprises a plurality of lasers fixed to a first surface of the substrate, the output light including a respective plurality of light beams generated by the plurality of lasers. In some exemplary embodiments, the optical transceiver device further comprises a scanning device for scanning the plurality of light beams over the region. The scanning device can comprise a scanning mirror. The scanning mirror can be a micro-electromechanical system (MEMS) scanning mirror.

In some exemplary embodiments, the optical detection element comprises an array of optical detectors. The optical detectors can comprise a silicon photomultiplier (SiPM). The optical detectors can comprise a multi-pixel photon counter (MPPC). The array of optical detectors can be a two-dimensional array.

The optical transceiver device can be part of an automotive LiDAR detection system. The LiDAR detection system can be a coaxial system.

According to another aspect, an optical transceiver devices is provided. The optical transceiver device includes a first substrate and a laser fixed to the first substrate, the laser generating output light for transmission along a transmission axis into a region. The optical transceiver device also includes a second substrate and a support structure fixed to the first and second substrates, the support structure mechanically supporting the first and second substrates. An optical detection element is fixed to the second substrate, the optical detection element receiving input light reflected from the region along a reception axis through an opening in the support structure. A mask having at least one slit is fixed to the support structure, the slit being aligned with the opening in the support structure, such that the reflected light received by the optical detection element from the region passes through the slit before it reaches the optical detection element.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIGS. 2A and 2B illustrate scanning of transmitted optical signals into a region and reception of returning optical signals for a first angular direction of scanning of a scanning mirror and a second opposite angular scanning direction the scanning mirror, respectively, according to exemplary embodiments.

FIGS. 9A and 9B include schematic diagrams illustrating portions of a scanning LiDAR system in which a coaxial configuration is implemented, according to some exemplary embodiments.

DETAILED DESCRIPTION

Figure 1:
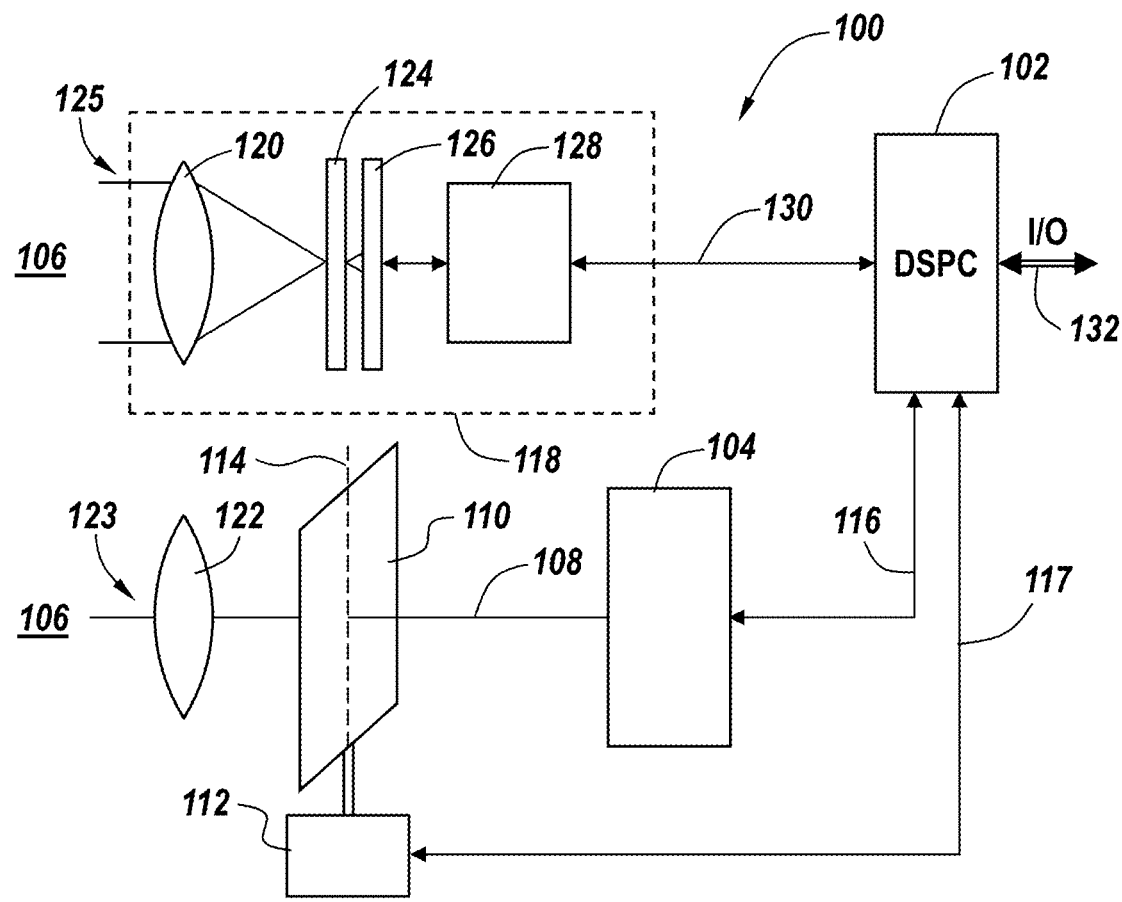
FIG. 1 includes a schematic functional block diagram of a scanning LiDAR system, according to exemplary embodiments.

The scanning LiDAR detection system described herein in detail can be of the type described in copending U.S. patent application Ser. No. 15/410,158, filed on Jan. 19, 2017, of the same assignee as the present application, the entire contents of which are incorporated herein by reference. According to the exemplary embodiments, the scanning LiDAR detection system of the present disclosure combines wide field of view with long detection range and high resolution. To achieve this in a biaxial system, i.e., a system in which the transmission optical axis is not the same as the reception optical axis, various features are combined in the system.

For example, the present system includes a high-sensitivity detector that can detect the relatively small number of photons reflected back from long range. Also, the detection device, i.e., detector array, of the present system is of relatively large size, thus providing an optical aperture collecting returning light from a relatively wide field of view. The detection system, i.e., detector array, of the present disclosure has relatively high bandwidth to allow capture of a relatively short-duration light pulse. In some particular exemplary embodiments, the waveform is a pulsed frequency-modulated continuous-wave (FMCW) signal having a pulse repetition frequency (PRF) of 50-150 MHz. At 50% duty cycle, the light pulse duration can be 3.3-10 ns, which is captured by the high-bandwidth detector array of the disclosure.

Additionally, it is known that ambient light, such as sunlight, can cause shot noise in the detection system. According to the present disclosure, the amount of ambient light, e.g., sunlight, impinging on the detection system is substantially reduced. Dynamic range is maximized such that both bright objects at short distance and low-reflectivity objects at long range can be detected with the same configuration.

Thus, the scanning LiDAR system of the disclosure reduces the amount of ambient light and the signal light from objects at short distance that can reach the detection system by means of spatial filtering matching the far field laser pattern. This enables the combination of a large sensitive detector, a narrow laser beam and high signal-to-noise ratio (SNR) at long range in daytime conditions.

According to the present disclosure, a fixed or moving mask is positioned in the focal plane of a receiver lens in the detection system, i.e., LiDAR sensor. The mask includes a set of slits and is aligned with the scan pattern of the transmitter. This enables the use of avalanche photodiode detectors (APDs) in the optical detector array. In alternative embodiments, silicon photomultipliers (SiPMs), also referred to as multi-pixel photon counters (MPPCs) can be used in the optical detector array. The SiPM array is an array of light-sensitive microcells, each in a binary single photon counting mode. Alternatively, APDs in the array are analog components, i.e., not operated in Geiger/photon counting mode. The array provides a very high gain over a large detector area combined with analog output and large bandwidth.

The LiDAR system of the present disclosure reduces ambient light by a factor of 5 to 500, and typically by a factor of 5 to 50. This results in increased SNR and increased range in daytime conditions. The system increases dynamic range due to focus change with respect to distance. The effective sensitivity of the APDs or SiPMs is increased, in the case of SiPMs, due to the non-linearity of the components. According to some exemplary embodiments, with the LiDAR system of the disclosure focused at infinity, the focal plane of the lens coincides with the slits in the mask. The focus shifts as the distance to a target object changes. At long range, the image plane will coincide with the focal plane of the lens, where the mask is placed. At closer range, the image plane will move away from the focal plane of the lens, i.e., further from the lens. This means that a significant amount of light will be blocked by the slit, and, therefore, the signal level at close range is substantially reduced, leading to increased dynamic range.

FIG. 1 includes a schematic functional block diagram of a scanning LiDAR system 100, according to exemplary embodiments. Referring to FIG. 1, system 100 includes a digital signal processor and controller (DSPC) 102, which performs all of the control and signal processing required to carry out the LiDAR detection functionality described herein in detail. An optical source 104 operates under control of DSPC 102 via one or more control signals 116 to generate the one or more optical signals transmitted into a region 106 being analyzed. Among other functions, control signals 116 can provide the necessary control to perform wave shaping such as, in some exemplary embodiments, pulsed frequency-modulated continuous-wave (FMCW) modulation envelope control to produce the pulsed FMCW optical signal of some exemplary embodiments. Optical source 104 can include a single laser, or optical source 104 can include multiple lasers, which can be arranged in a one-dimensional or two-dimensional array. One or more optical signals 108 from source 104, which can be the pulsed FMCW optical signal of some exemplary embodiments, impinge on scanning mirror 110, which can be a microelectromechanical system (MEMS) scanning mirror. Scanning mirror 110 is rotatable about an axis 114 by an actuator 112, which operates under control of one or more control signals 117 provided by DSPC 102 to control the rotation angle of scanning mirror 110, such that the one or more output optical signals are scanned at various angles into region 106. The output optical signals pass through a lens or glass plate 122, which generates one or more collimated optical signals which are scanned across region 106.

Returning optical signals 125 are received from region 106 at receive subsystem 118. Receive subsystem 118 includes a lens 120 which receives and focuses light 125 returning from region 106. According to exemplary embodiments, mask 124 is located at the focal plane of lens 120, such that the returning light is focused at mask 124. Light passing through mask 124 impinges on optical detector array 126, which, in some exemplary embodiments, can include SiPM or MPPC photomultipliers. Detector array 126 converts the received optical signals to electrical signals, and a processor 128 generates digital signals based on the electrical signals and transmits the digital signals 130 to DSPC 102 for processing to develop target object identification, tracking and/or other operations. Reports of detections to one or more user interfaces or memory or other functions can be carried out via I/O port 132.

Figure 2A:
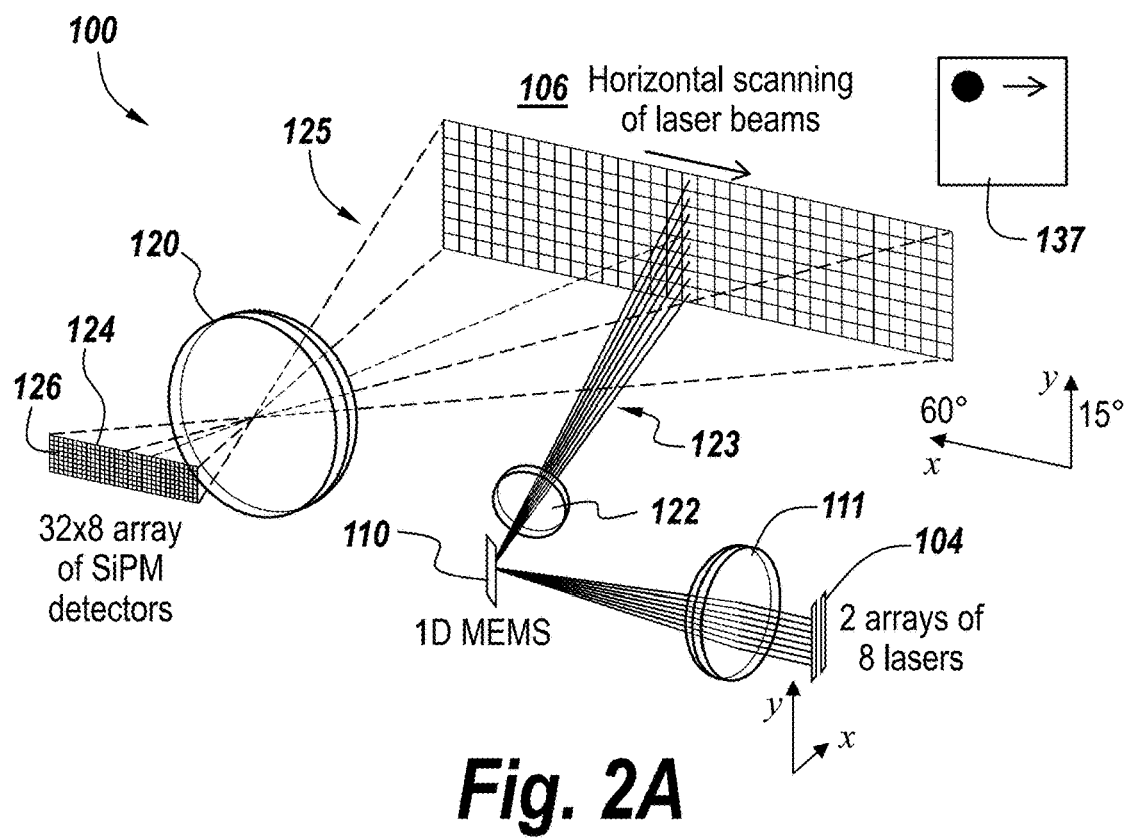
FIGS. 2A and 2B include schematic functional diagrams illustrating portions of the scanning LiDAR system of FIG. 1. Specifically.
Figure 2B:
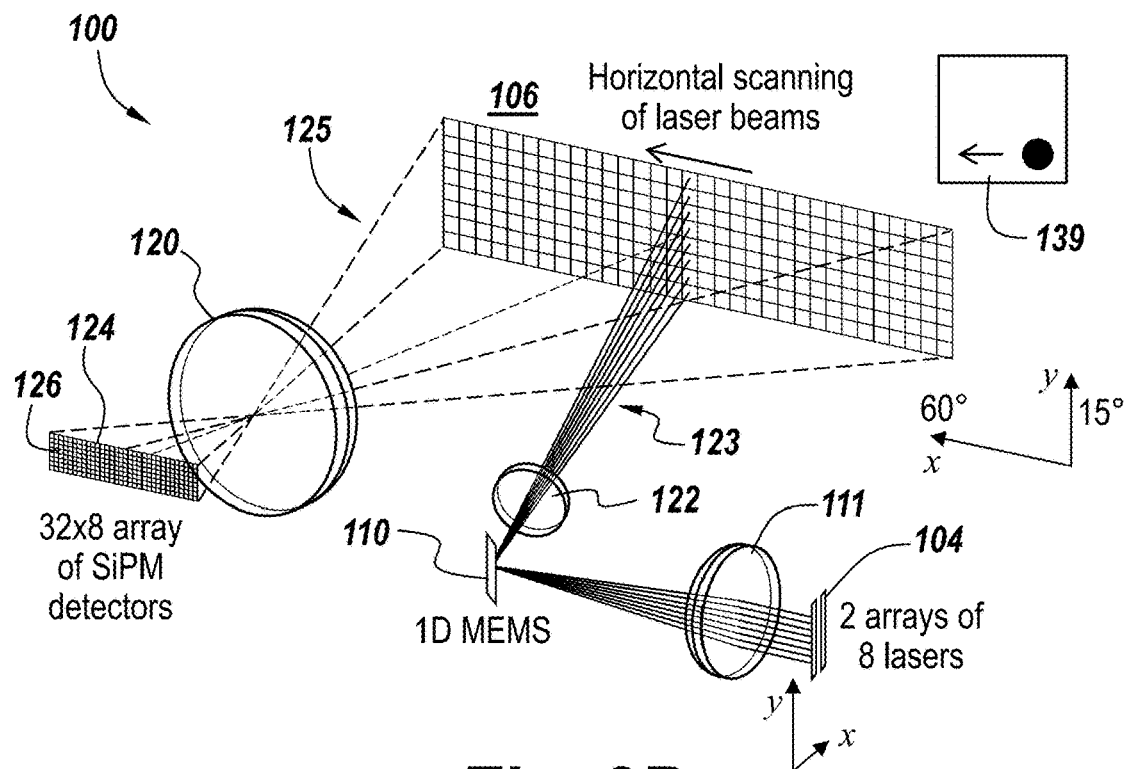

FIGS. 2A and 2B include schematic functional diagrams illustrating portions of scanning LiDAR system 100 of FIG. 1, according to exemplary embodiments. FIGS. 2A and 2B illustrate scanning of the transmitted optical signals into region 106 and reception of returning optical signals for a first angular direction of scanning of scanning mirror 110 about axis 114 and a second opposite angular scanning direction of scanning mirror 110 about axis 114, respectively.

Referring to FIGS. 1, 2A and 2B, optical source 104 can include one or more linear arrays of lasers disposed along parallel axes. That is, each linear array of lasers includes a plurality of lasers disposed along a vertical axis, i.e., a y-axis. In the exemplary embodiment illustrated in FIGS. 2A and 2B, two linear arrays are disposed along parallel axes in the y-axis direction. The axes are displaced along a horizontal axis, i.e., an x-axis. Also, the two linear laser arrays are displaced also in the vertical direction (y-axis) in order to generate different elevation angles. Alternatively, the linear laser arrays could be rotated around the x-axis in order to generate different elevation angles. Thus, as illustrated in FIGS. 2A and 2B, the two parallel linear laser arrays create a two-dimensional array of laser outputs transmitted orthogonal to the x-y plane. In some particular exemplary embodiments, each of two linear arrays includes 8 lasers disposed along the y-axis, for a total of 16 lasers in the two-dimensional array. It will be understood that any number of lasers can be used, in accordance with the present embodiments. For example, in some particular exemplary embodiments, two linear arrays of 11 lasers, i.e., a total of 22 lasers, are used.

Continuing to refer to FIGS. 1, 2A and 2B, in some exemplary embodiments, the optical output signals from the laser array in source 104 are focused by a lens 111 onto MEMS scanning mirror 110. The optical signals are reflected from scanning mirror 110 through glass plate or lens 122, which generates the substantially mutually parallel collimated optical output signals 123. Controlled rotation of scanning mirror 110 via actuator 112 and DSPC 102 scans the collimated optical output signals 123 over region 106. Output signals or beams 123 constitute a fan of beams 123, where each beam is collimated. In some particular exemplary embodiments, the fan angle can be 15° to 22°. In some alternative embodiments, beams 123 are substantially mutually parallel. Light 125 returning from region 106, for example, light reflected from one or more target objects, is received at lens 120 of receive subsystem 118. Lens 120 focuses the returning light 125 onto mask 124, which is positioned in front of optical detector array 126, which, as illustrated in FIGS. 2A and 2B, can be, for example, a 32×8 array of APDs. As noted above the detectors in detector array 126 can also be SiPMs. Thus, in the particular illustrated exemplary embodiments, 32×8 SiPM detectors are arranged to provide a focal plane detector. Detector array 126 converts the received optical signals to electrical signals, and processor 128 generates digital signals based on the electrical signals and transmits the digital signals 130 to DSPC 102 for processing to develop target object identification, tracking and/or other operations. Reports of detections to one or more user interfaces or memory or other functions can be carried out via I/O port 132.

Thus, as illustrated in FIGS. 2A and 2B, in some particular exemplary embodiments, two arrays of 1×8 lasers are used to generate 16 individual laser beams, each beam with a nominal divergence of <0.1°. The vertical divergence of the group of 8 beams is nominally approximately 15°. Scanning mirror 110 is controlled to scan across a nominal range of approximately 60°, i.e., ±30° from its centered position. These angular limits are illustrated in FIGS. 2A and 2B in the diagrams of the x-y plane. FIG. 2A illustrates the case in which the output optical signals 123 are scanned in a first direction (to the right in FIG. 2A) via angular rotation of scanning mirror 110 in a first angular direction, and FIG. 2B illustrates the case in which the output signals 123 are scanned in a second direction (to the right in FIG. 2B) via angular rotation of scanning mirror 110 in a second angular direction. The resulting returning optical signals are scanned across the columns of the 32×8 detector array 126 illuminating pixels in the array in a predetermined order determined by the scanning of the output optical signals 123 into region 106, as illustrated in the schematic illustrations of pixel illumination scanning 137 and 139 in FIGS. 2A and 2B, respectively. It will be understood that all of these parameters are exemplary nominal values. According to the present disclosure, any number of lasers can be used, having a group beam divergence of greater than or less than 15°, and the angular scanning limits can be greater than or less than ±30° from the centered position of scanning mirror 110.

According to the exemplary embodiments, since detector array has 8 detectors in the vertical (y) direction, only one vertical linear array, i.e., column, is turned on at a time. That is, detector array 126 is read out one column at a time, in synchronization with the laser scan. This time multiplexing provides a "rolling shutter" which limits the influence of environmental light, i.e., sunlight, since only one column of detectors is receiving at a time. Additionally, mask 124, implemented in the form of a two-dimensional array of slits, is placed in front of detector array 126 to reduce further the amount of ambient light reaching detector array 126.

Figure 3:
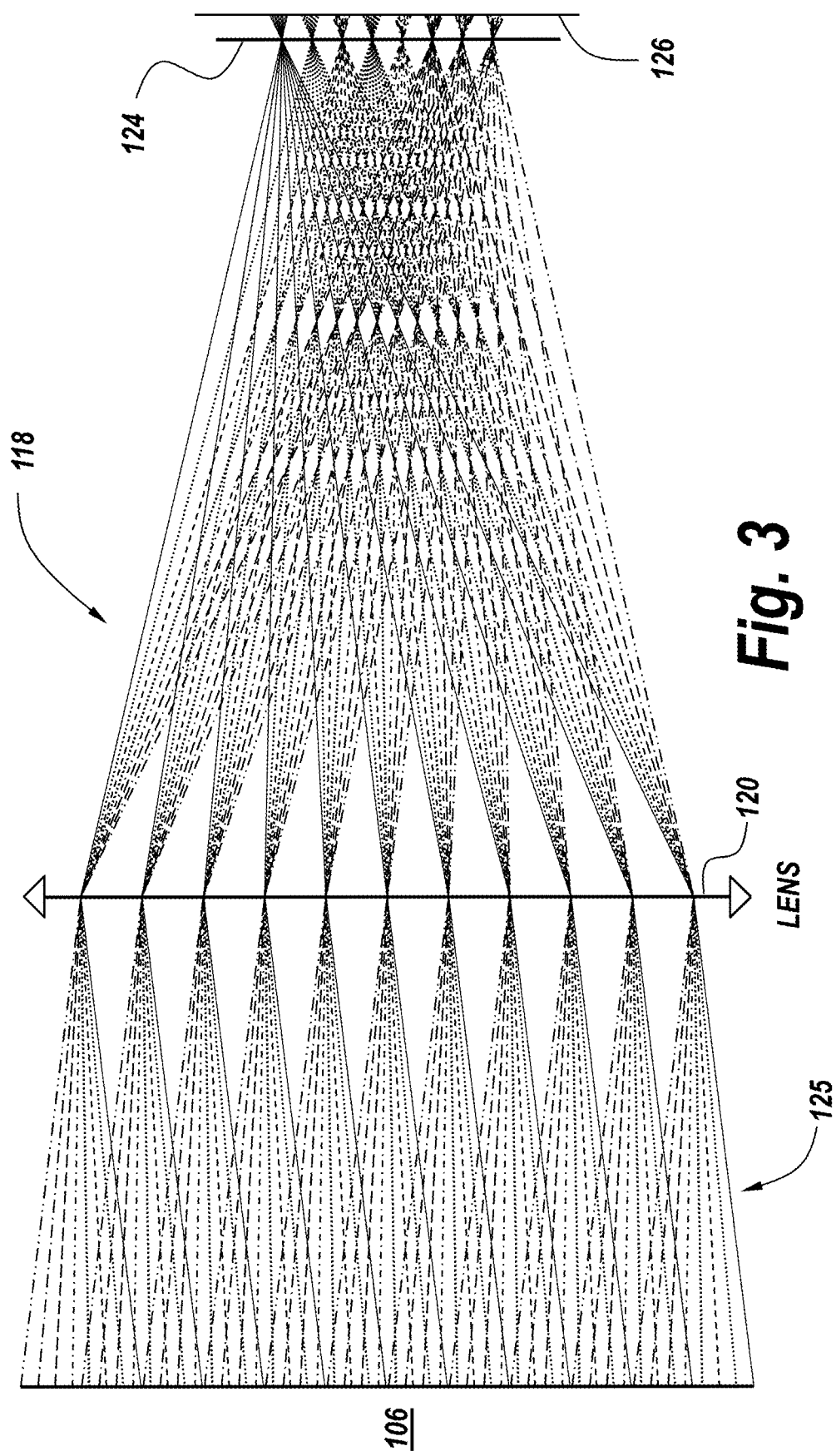
FIG. 3 includes a schematic diagram of a receive subsystem of the scanning LiDAR system of FIGS. 1, 2A and 2B, according to exemplary embodiments.

FIG. 3 is a schematic diagram of receive subsystem 118, according to exemplary embodiments. Referring to FIG. 3, and with reference to the foregoing detailed description of FIGS. 1, 2A and 2B, light 125 returning from region 106 impinges on lens 120. Mask 124 is placed at the focal plane of lens 120, such that light 125 is focused at mask 124. Light passing through mask 124 is received at detector array 126.

Figure 4:
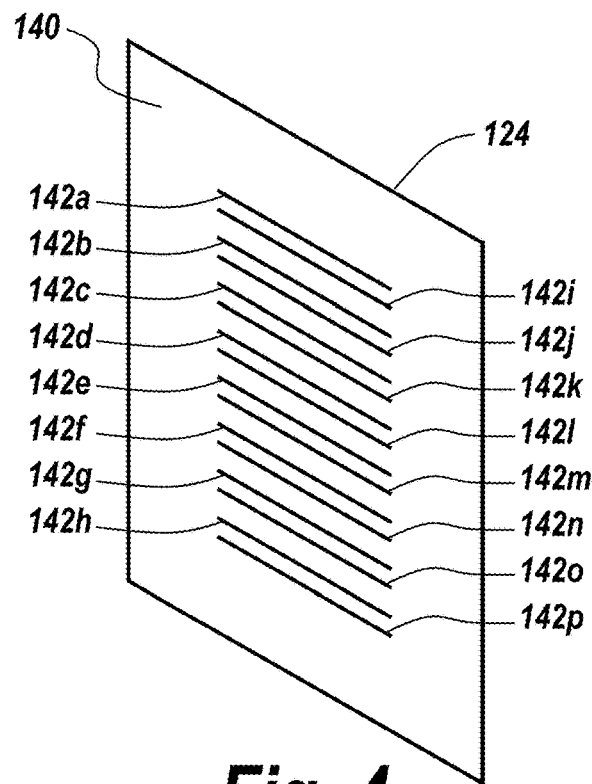
FIG. 4 includes a schematic diagram of a mask in the receive subsystem of FIG. 3, according to exemplary embodiments.

FIG. 4 includes a schematic diagram of mask 124, according to some exemplary embodiments. Mask 124 includes an optically opaque portion 140 and a plurality of optically transparent horizontal slits 142a-142p. It is noted that the use of 16 slits is consistent with the particular illustrative exemplary embodiment described herein in which light source 104 includes two linear arrays of 8 lasers each. It will be understood that where a different laser configuration or quantity is used, mask 124 would include a different number of slits 142. For example, in the case in which source 104 includes two linear arrays of 11 lasers, mask 124 would include 22 slits 142.

Referring to FIG. 4, it is noted that alternating slits 142 are associated with the same linear laser array in source 104. That is, specifically, each of alternating slits 142a through 142h is associated with returning light generated by a respective one of the eight lasers in one of the vertical linear arrays of lasers in source 104, and each of alternating slits 142i through 142p is associated with returning light generated by a respective one of the eight lasers in the other of the vertical linear arrays of lasers in source 104. In accordance with some exemplary embodiments, the linear arrays of lasers of source 104 are offset vertically with respect to each other. As a result, the alternating groups of slits 142a-142h and 142i-142p are offset vertically with respect to each other on mask 124, such that returning light associated with each laser is in alignment with its corresponding slit.

Mask 124 can be made of one of various possible materials, such as plastic, metal, metal foil, or other material. Slits 142 can be formed in mask 124 by laser. In other embodiments, opaque portion 140 and slits 142 can be formed by photolithographic processes. For example, the opaque portion 140 can be formed of an optically sensitive opaque material, and slits 142 can be formed by selective exposure of the optically sensitive opaque material, e.g., through a patterned mask, followed by appropriate developing and further processing to generate the transparent slits 142.

Figure 5:
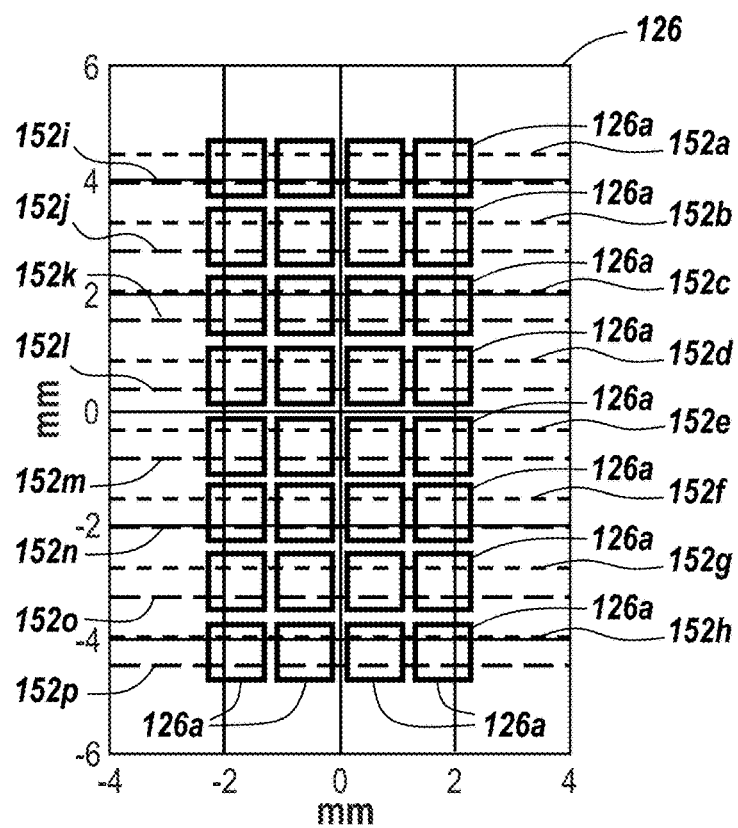
FIG. 5 includes a schematic elevational view of a portion of a detector array in the receive subsystem of FIG. 3, according to exemplary embodiments.

FIG. 5 includes a schematic elevational view of a portion of detector array 126, according to some exemplary embodiments. Referring to FIG. 5, eight rows of four detectors 126a are illustrated. That is, 32 of the 256 detectors 126a in detector array 126 are illustrated for clarity of illustration and description. As described above, according to the present disclosure, each of detectors 126a can be an APD or SiPM. FIG. 5 also illustrates the received pulses of light 125 returning from region after being focused by lens 120 and passing through slits 142 in mask 124. These received pulses appear in FIG. 5 as broken lines along array 126 of detectors 126a. Specifically, broken lines 152a through 152h illustrate pulses of returning light 125 impinging on array 126 after passing through slits 142a through 142h, respectively, of mask 140. Similarly, broken lines 152i through 152p illustrate pulses of returning light 125 impinging on array 126 after passing through slits 142i through 142p, respectively, of mask 140. Thus, referring to FIGS. 1-5, because of the vertical, y-axis offset between the linear arrays of lasers in source 104, each detector 126a of array 126 receives and processes light from a plurality of lasers, e.g., two lasers as illustrated in FIG. 5, the light passing through a respective plurality of slits 142, e.g., two slits, in mask 124.

Thus, according to the present disclosure, in some exemplary embodiments, mask 124 having 2N horizontal slits is placed in front of detector array 126 of detectors 126a, the array 126 having N detectors 126a in the vertical, i.e., y, direction. Mask 124 is aligned with the scan pattern of 2N horizontally alternately scanning laser beams. Continuing to refer to FIG. 5, in some particular exemplary embodiments, slits 142 could be as small as the diffraction limit allows, i.e., $\lambda \times$ f-number~1 µm. In some embodiments, the width of slits 142 can be ~0.1 mm, due to alignment tolerances. With two 0.1 mm slits 142 per 1 $mm^2$ detector element 126a, ambient light is reduced by a nominal factor of 5, but a factor of ~500 is also possible.

According to the exemplary embodiments, array 126 is an array of APDs or SiPMs, which provide certain advantages and improvements. For example, the large size and short response time of the detector elements 126a provide array 126 with a large detection area. This in turn enables a large light-collecting aperture of the receiving subsystem lens. The increased light provides better signal-to-noise ratio (SNR) and longer range. Also, with mask 124 in focus, but detector array 126 out of focus, local saturation of detector elements 126a is avoided. This results in increased dynamic range and further increased performance in high levels of ambient light.

According to the exemplary embodiments, with mask 124 in the focal plane of lens 120, all signal light passes through slits 142 in mask 124 at long distances. Without mask 124, the optical signal intensity would vary inversely with the square of the distance. Therefore, at short range, signal intensity would be extremely high, which can cause a drop in system dynamic range. With mask 124 inserted as described herein in detail, only a small fraction of the returning light at short distances passes through slits 142, which eliminates the reduction in dynamic range caused by light returning from short-range target objects.

Figure 6:
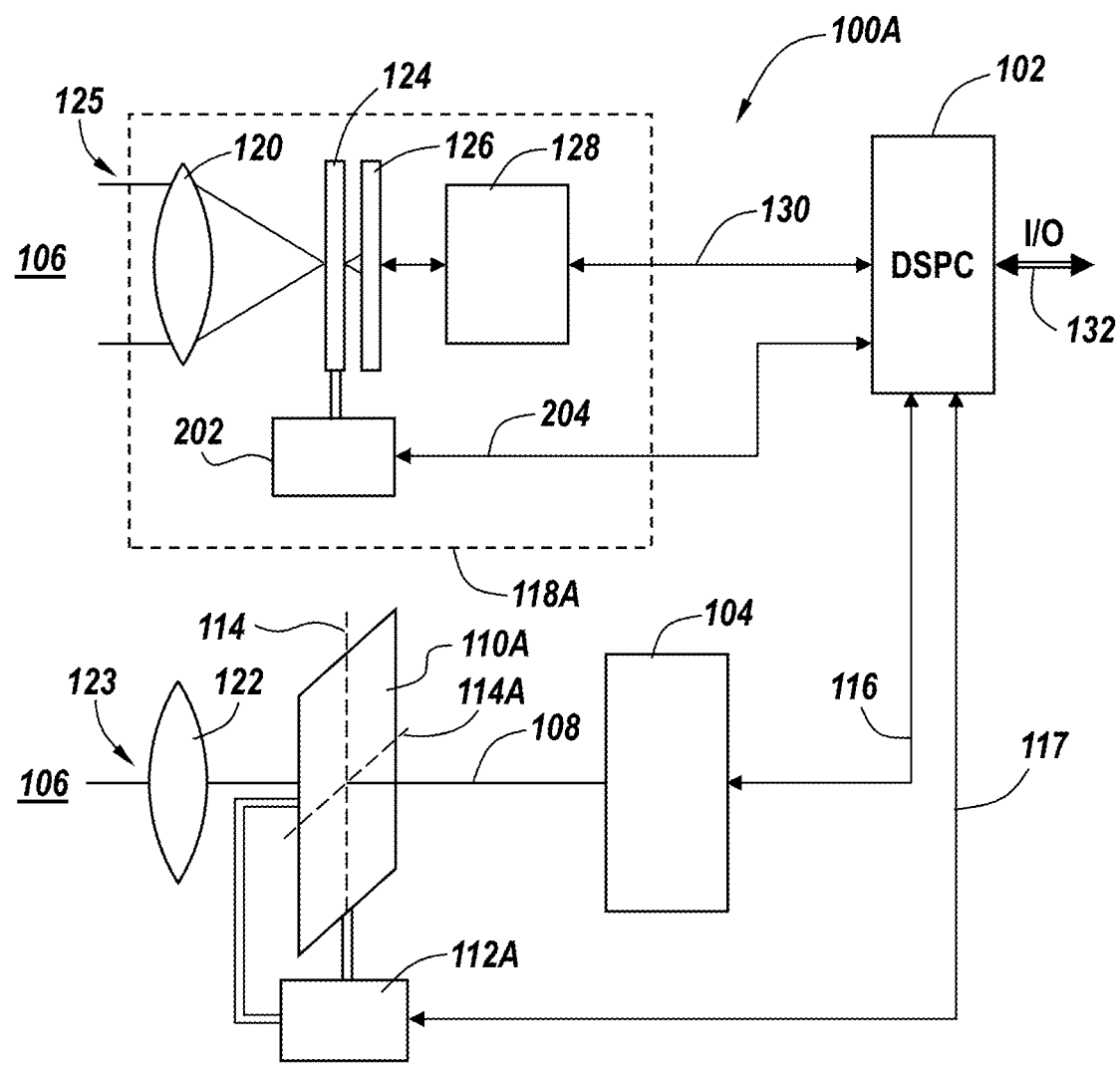
FIG. 6 includes a schematic functional block diagram of a scanning LiDAR system, in which horizontal and vertical scanning are performed, according to exemplary embodiments.
Figure 7:
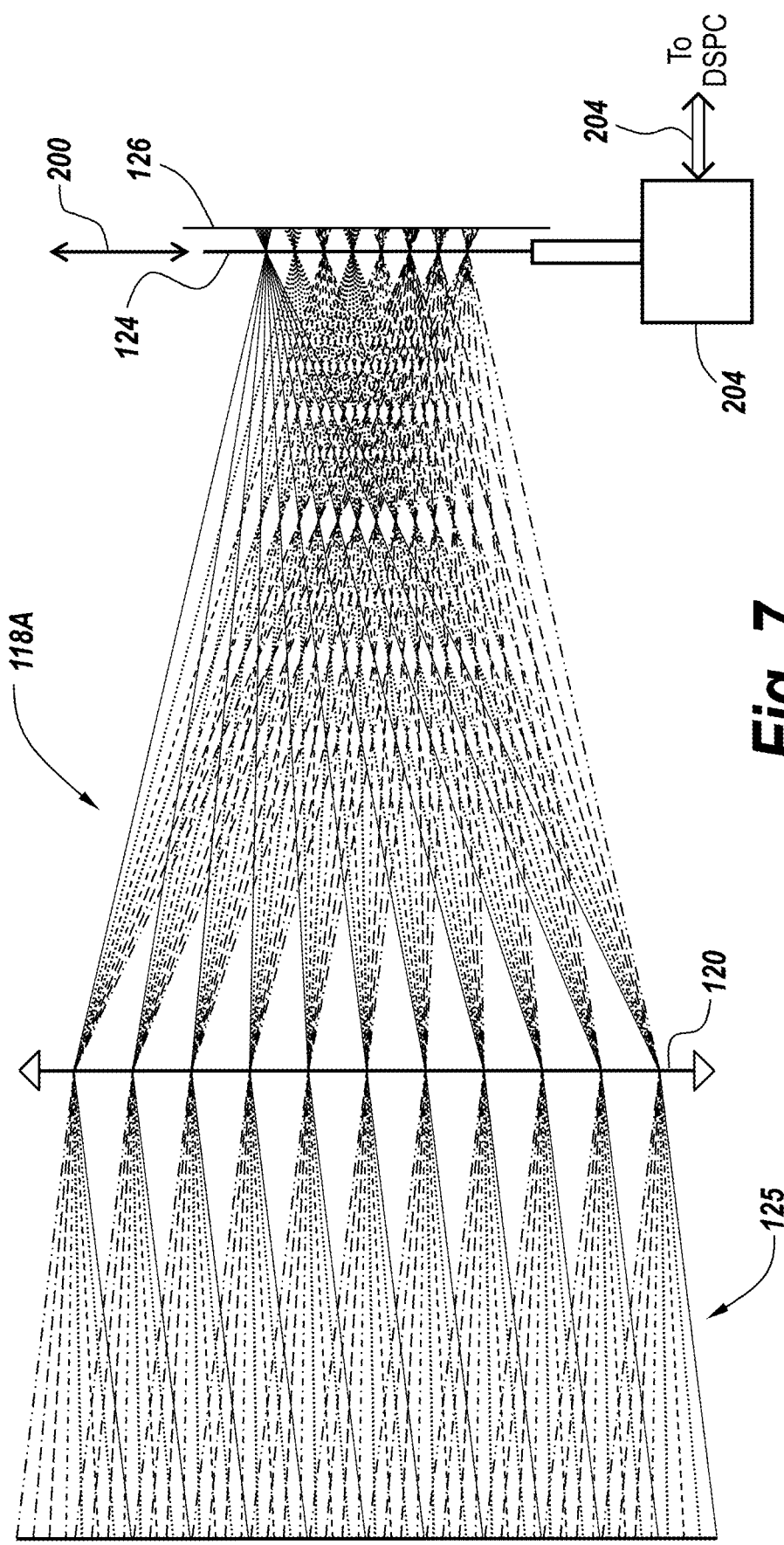
FIG. 7 includes a schematic diagram of a receive subsystem of the scanning LiDAR system of FIG. 6, in which horizontal and vertical scanning are performed, according to exemplary embodiments.

In some embodiments, in addition to horizontal scanning as described above in detail, scanning can also be carried out vertically. The vertical scanning can be performed in order to increase vertical resolution. FIG. 6 includes a schematic functional block diagram of a scanning LiDAR system 100A, in which horizontal and vertical scanning are performed, according to exemplary embodiments. FIG. 7 includes a schematic diagram of receive subsystem 118A in scanning LiDAR system 100A of FIG. 6, in which horizontal and vertical scanning are performed, according to exemplary embodiments. Referring to FIGS. 6 and 7, elements that are substantially the same as those in FIGS. 1, 2A, 2B and 3 are identified by the same reference numerals. Referring to FIGS. 6 and 7, in this embodiment, actuator 112A, in addition to initiating and controlling horizontal scanning of scanning mirror 110A about vertical axis 114, initiates and controls vertical scanning of scanning mirror 110A about horizontal axis 114A. In this alternative embodiment, mask 124 is also moved vertically alternately up and down in synchronization with the vertical scanning of scanning mirror 110A, as indicated by arrow 200 in FIG. 7. Vertical movement of mask 124 is initiated by a mechanical actuation device, such as a piezoelectric actuator 202, in synchronization with scanning of scanning mirror 110A, such that alignment of slits 142 of mask 124 with returning light 125 is maintained. This synchronization is accomplished via interface 204 with DSPC 102.

Figure 8:
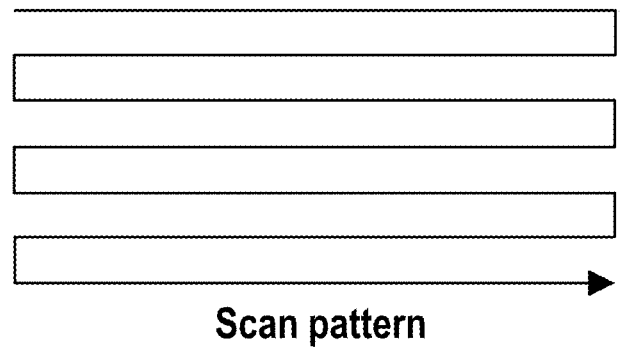
FIG. 8 includes a schematic diagram illustrating the pattern of light beams scanned over the detector array of the receive subsystem of FIG. 7, in the case in which vertical and horizontal scanning are performed, according to exemplary embodiments.

FIG. 8 is a schematic diagram illustrating the pattern of light beams scanned over detector array 126, in the case in which vertical and horizontal scanning are used, according to exemplary embodiments. Referring to FIG. 8, in some embodiments, as illustrated by the scan pattern, at the end of each horizontal scan line, scanning mirror 110A is rotated one step vertically. At the same time, mask 124 is moved vertically to ensure alignment of slits 142 in mask 124. This process of horizontal scan lines separated by vertical scanning increments results in the serpentine pattern of light beams impinging on detector array 126, as illustrated in FIG. 8.

In the foregoing detailed description, scanning LiDAR systems 100, 100A of the exemplary embodiments are shown as having biaxial configurations. That is, systems 100, 100A are illustrated and described as having separate output (transmission) axes and input (reception) axes. Output signals 123 are transmitted into region 106 along a first axis, and returning light signals 125 are received from region 106 along a second axis different than the first axis. The present disclosure is also applicable to coaxial system configurations in which the input and output axes are substantially the same.

Figure 9A:
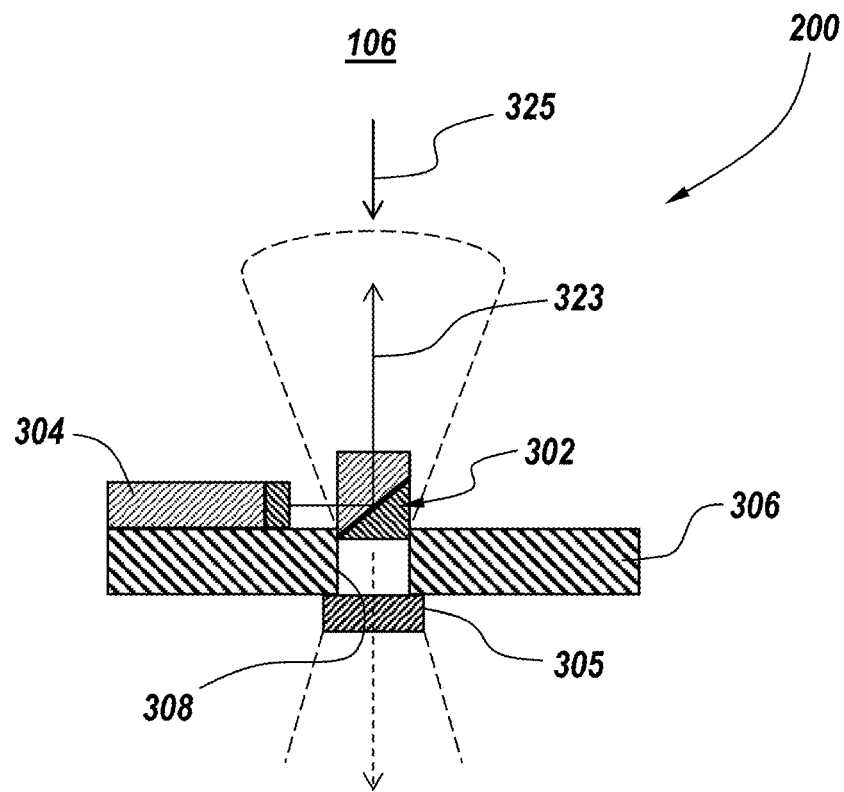

FIGS. 9A and 9B include schematic diagrams illustrating portions of a scanning LiDAR system 200 in which a coaxial configuration is implemented, according to some exemplary embodiments. FIG. 9A illustrates a single coaxial configuration, and FIG. 9B illustrates multiple coaxial configurations in parallel. Referring to FIGS. 9A and 9B, a laser light source 304 integrated on or in a substrate 306 generates an output beam of light. The output beam is reflected by a polarizing beam splitting cube 302 such that output signals 323 are transmitted into region 106. Returning light signals 325 from region 106 are transmitted through beam splitting cube 302, through an opening 308 in substrate 306. The light may pass through an optional bandpass filter 305, which further reduces the ambient light. In some exemplary embodiments, bandpass filter 305 is characterized by a drift in its wavelength pass band which is dependent on temperature. Laser light source 304 can also have a temperature-dependent drift in wavelength of its output. In some exemplary embodiments, the temperature drift of laser light source 304 and that of bandpass filter 305 are matched, such that temperature effects on operation of the overall system are substantially reduced.

Figure 10A:
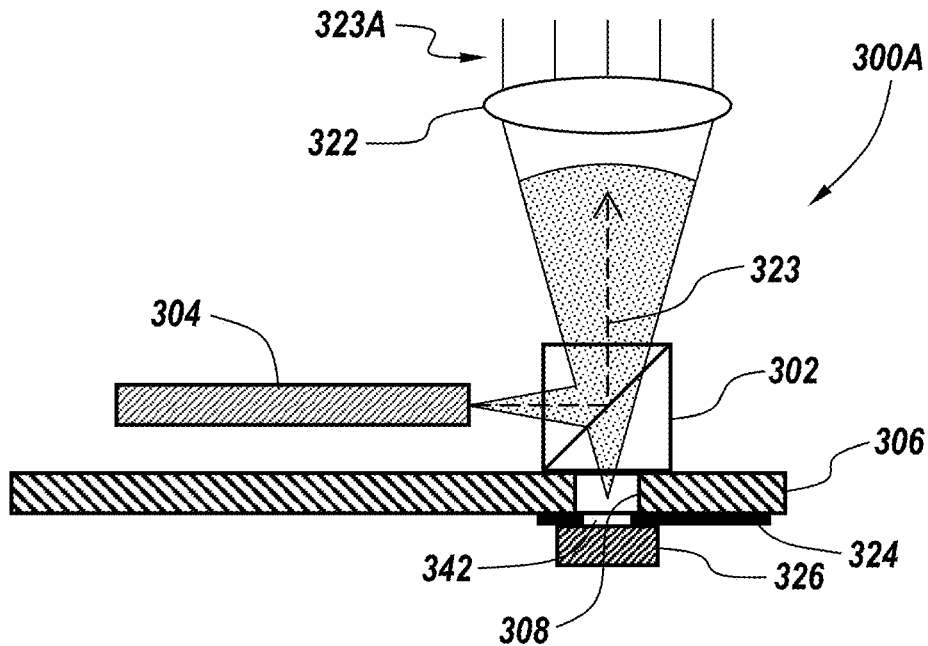
FIGS. 10A and 10B include schematic diagrams illustrating portions of scanning LiDAR systems in which a coaxial configuration is implemented, according to some exemplary embodiments.
Figure 10B:
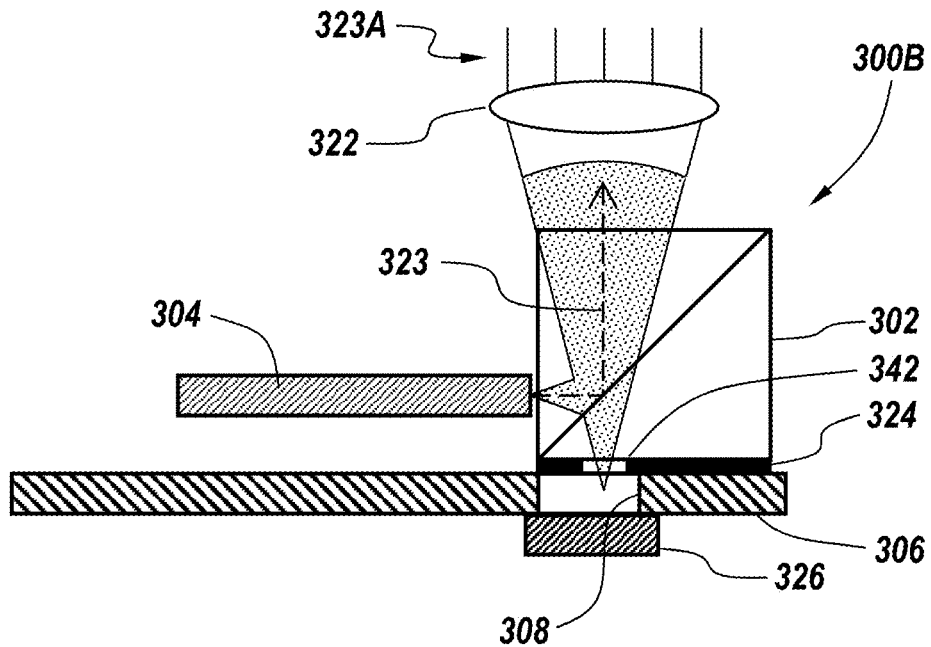

FIGS. 10A and 10B include schematic diagrams illustrating portions of scanning LiDAR systems 300A and 300B, respectively, in which a coaxial configuration is implemented, according to some exemplary embodiments. The primary difference between systems 300A, 300B of FIGS. 10A and 10B is that, in system 300A, mask 324 is under substrate 306, and, in system 300B, mask 324 is at the top side of substrate 306. In both systems 300A and 300B, incoming light from polarizing beam splitting cube 302 passes through slits 342 in mask 324 and impinges on APD or SiPM detector 326. In the embodiments of FIGS. 10A and 10B, lens 322 generates the substantially mutually parallel collimated optical output signals 323A. Controlled rotation of the scanning mirror scans the substantially mutually parallel collimated optical output signals 323A over the region being analyzed.

Figure 11:
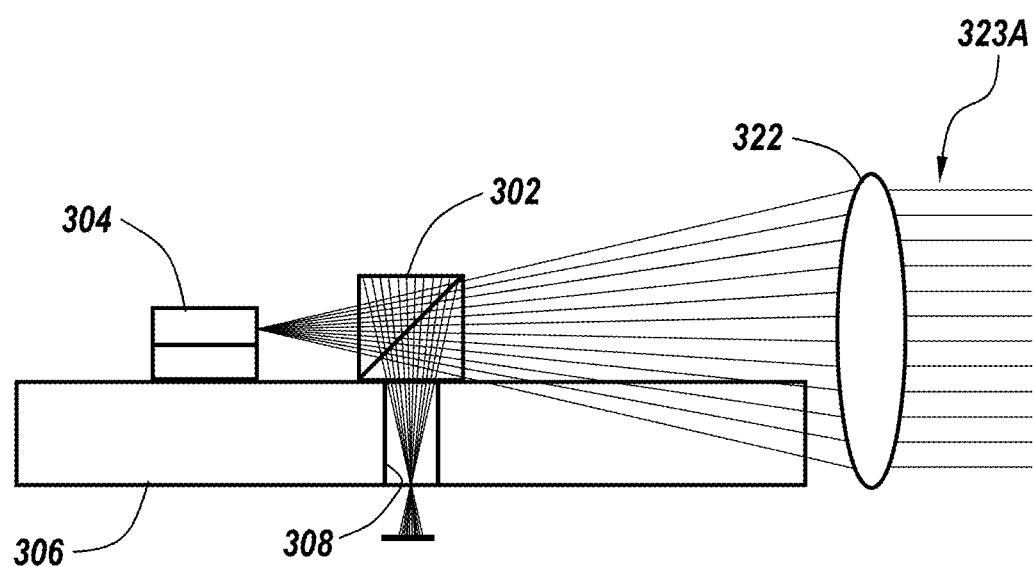
FIG. 11 includes a schematic diagram illustrating any of the coaxial scanning LIDAR systems described herein, according to some exemplary embodiments.

FIG. 11 includes a schematic diagram illustrating any of systems 200, 300A, 300B, illustrating the size relationship between the opening 308 or slit 342 and the pupil of the laser source 304. As in the embodiments described in detail above, in the embodiment of FIG. 11, lens 322 generates the collimated optical output signals 323A. Controlled rotation of the scanning mirror scans the collimated optical output signals 323A over the region being analyzed. Optical output signals or beams 323A constitute a fan of beams 323A, where each beam is collimated. In some particular exemplary embodiments, the fan angle can be 15° to 22°. In some alternative embodiments, beams 323A are substantially mutually parallel.

It should be noted that polarizing beam splitting cube 302 in the embodiments described above in detail in connection with FIGS. 9A, 9B, 10A, 10B and 11 need not be a cube. In alternative embodiments, polarizing beam splitting cube 302 can be replaced with a polarizing beam splitting plate tilted at an appropriate angle with respect to the optical paths of the respective systems.

Figure 12:
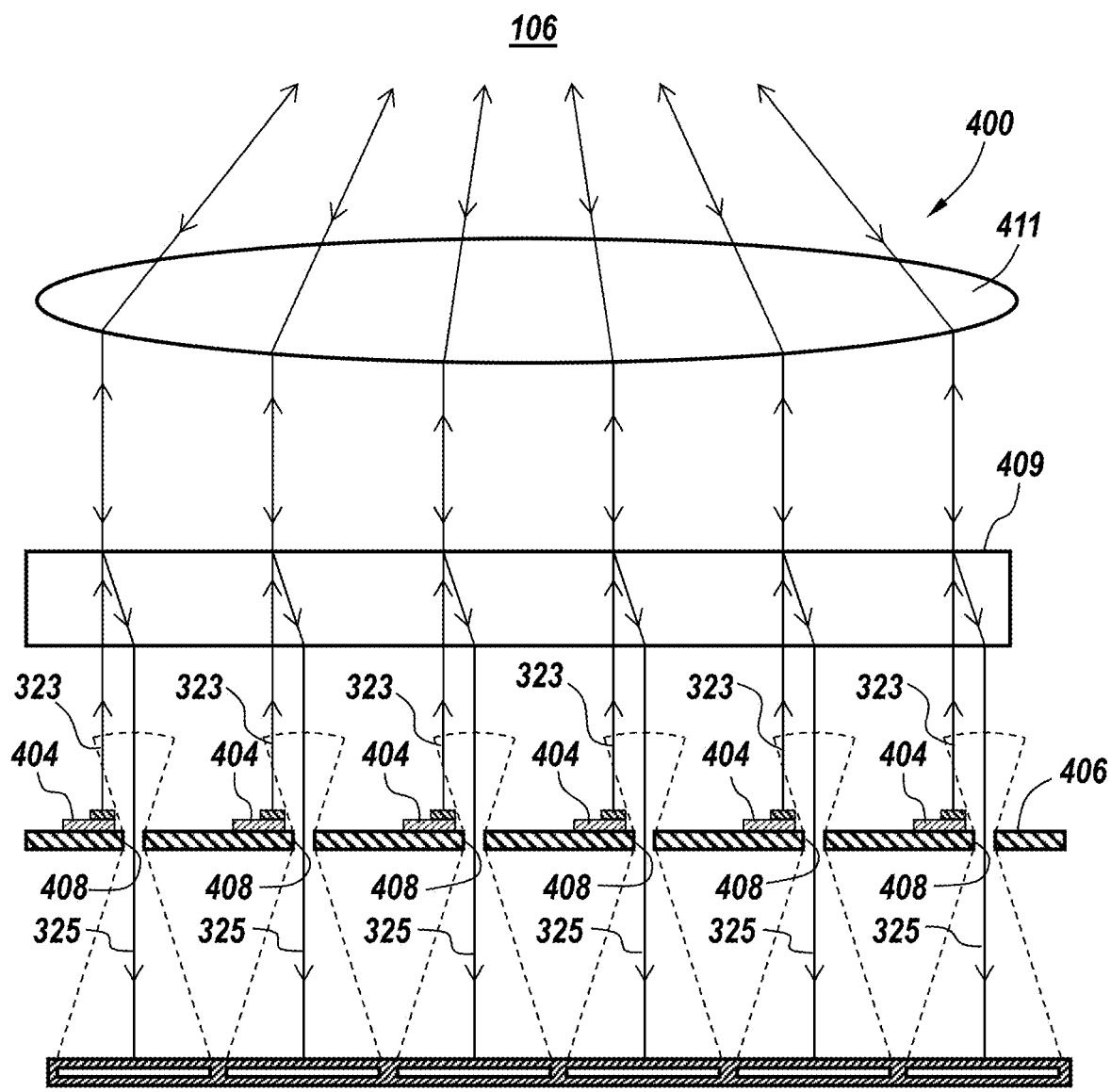
FIG. 12 includes a schematic diagram illustrating a portion of a scanning LiDAR system in which a coaxial configuration is implemented, according to some exemplary embodiments.

FIG. 12 includes a schematic diagram illustrating a portion of a scanning LiDAR system 400 in which a coaxial configuration is implemented, according to some exemplary embodiments. System 400 differs from systems 200, 300A and 300B in that, in system 400, no beam splitting cube is included. Instead, laser light source 404 provides output light 323 in a vertical direction into region 106 through an optical element such as birefringent crystal 409 and lens 411. Returning light 325 passes through lens 411 and birefringent crystal 409 such that the returning light is shifted to pass through apertures 408 in substrate 406 toward the detector array. Birefringent crystal 409 affects the two polarization directions of the light differently. One is laterally shifted, and the other is not shifted. Hence, birefringent crystal 409 acts as a polarizing beam splitter. Birefringent crystal 409 can be made of a material such as calcite, or other similar material.

According to exemplary embodiments, a coaxial scanning LiDAR system, such as coaxial systems 200, 300A, 300B and 400 illustrated in FIGS. 9A, 9B, 10A, 10B, 11 and 12, can be implemented using a selected configuration which may include one or more lasers, polarizing beam splitters, apertures or slits, filters and detectors in combination. For example, configurations can vary depending on the laser and aperture or opening subassembly and/or the detector type and configuration. In some embodiments, the laser or lasers can be discrete lasers. In other embodiments, one or more arrays of multiple lasers can be used. Similarly, in the case of detectors, one or more discrete detectors, such as APDs or SiPMs, can be used. In other embodiments, one or more arrays of detectors, such as arrays of APDs or SiPMs, can be used.

Figure 13A:
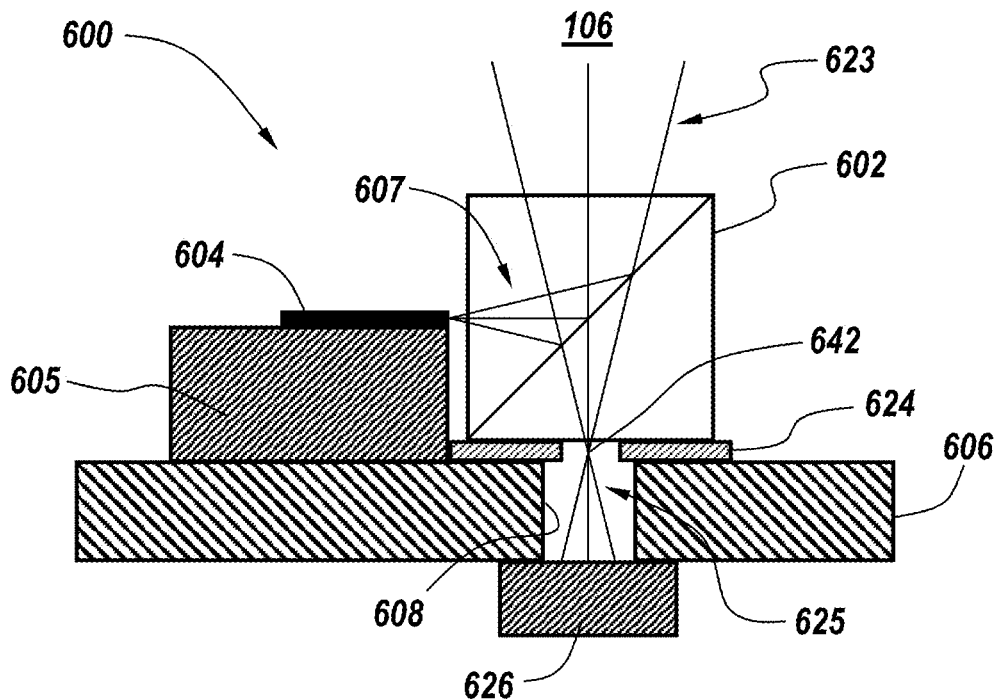
FIGS. 13A and 13B include schematic cross-sectional diagrams which illustrate two configurations of coaxial scanning LiDAR systems, in which discrete lasers and discrete detectors are used, according to some exemplary embodiments.
Figure 13B:
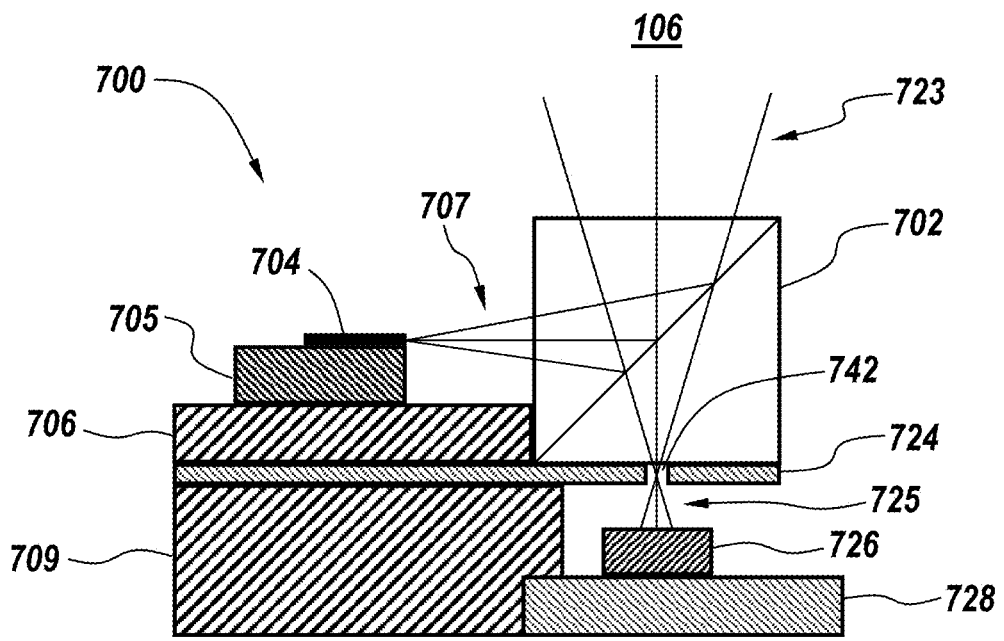

FIGS. 13A and 13B include schematic cross-sectional diagrams which illustrate two configurations of coaxial scanning LiDAR systems 600 and 700, respectively, in which discrete lasers and discrete detectors are used, according to some exemplary embodiments. Referring to FIG. 13A, a laser light source 604 is integrated on or over a substrate 606, with a layer of inert spacing material 605, made of, for example, printed circuit board (PCB) material, epoxy, metal or similar material, mounted therebetween. Laser light source 604 generates an output beam of light 607, which impinges on a beam splitting cube 602, such that output signals 623 are transmitted into region 106. Returning light signals from region 106 are transmitted through beam splitting cube 602, through a slit 642 in mask 624 and then through opening 608 in substrate 606. It should be noted that beam splitting cube 602 can be a polarizing beam splitting cube. It should also be noted that, as with the embodiments described above, beam splitting cube 602, or polarizing beam splitting cube 602, need not be a cube. It may be a beam splitting plate or polarizing beam splitting plate tilted at an appropriate angle with respect to the optical path(s). Light beams 625 from slit 642 pass through opening 608 in substrate 606 and are detected by detector 626, which is mounted to the bottom side of substrate 606. In some exemplary embodiments, detector 626 is a surface mount device mounted to the bottom surface of substrate 606. It should be noted that, in some exemplary embodiments, laser light source 604 is one of an array of laser light sources disposed in parallel along an axis directed substantially normal to the page of FIG. 13A. Similarly, polarizing or non-polarizing beam splitting cube or plate 602 can be a single long cube or plate, or multiple cubes or plates, extending along the same axis normal to the page. Similarly, detector 626 can be a single long detector or array of detectors, or multiple detectors or arrays of detectors, extending along the same axis normal to the page. In some exemplary embodiments, detector(s) or array(s) of detectors 626 can be SiPM or MPPC detectors.

Referring to FIG. 13B, a laser light source 704 is integrated on or over a substrate 706, with a layer of inert spacing material 705, made of, for example, printed circuit board (PCB) material, epoxy, or other similar material, mounted therebetween. Laser light source 704 generates an output beam of light 707, which impinges on a beam splitting cube 702, such that output signals 723 are transmitted into region 106. Returning light signals from region 106 are transmitted through beam splitting cube 702, through a slit 742 in mask 724. It should be noted that beam splitting cube 702 can be a polarizing beam splitting cube. It should also be noted that, as with the embodiments described above, beam splitting cube 702, or polarizing beam splitting cube 702, need not be a cube. It may be a beam splitting plate or polarizing beam splitting plate tilted at an appropriate angle with respect to the optical path(s). Light beams 725 from slit 742 are detected by detector 726, which is mounted to the top side or surface of second substrate 728. First substrate 706 and second substrate 728 are mechanically supported and properly located with respect to each other by a mounting/spacing support layer 709. Mounting/spacing support layer 709 can be made of, for example, a layer of inert spacing material, made of, for example, printed circuit board (PCB) material, epoxy, metal, or other similar material. The physical configuration of mounting/spacing support layer 709, i.e., dimensions, location, etc., are selected to provide appropriate support and stability among components such as laser light source 704, beam splitting cube 702, first substrate 706, second substrate 728, mask 724 and slit 742, such that the performance requirements of system 700 are met.

It should be noted that, in some exemplary embodiments, laser light source 704 is one of an array of laser light sources disposed in parallel along an axis directed substantially normal to the page of FIG. 13B. Similarly, polarizing or non-polarizing beam splitting cube or plate 702 can be a single long cube or plate, or multiple cubes or plates, extending along the same axis normal to the page. Similarly, detector 726 can be a single long detector or array of detectors, or multiple detectors or arrays of detectors, extending along the same axis normal to the page. In some exemplary embodiments, detector(s) or array(s) of detectors 726 can be SiPM or MPPC detectors.

Figure 14A:
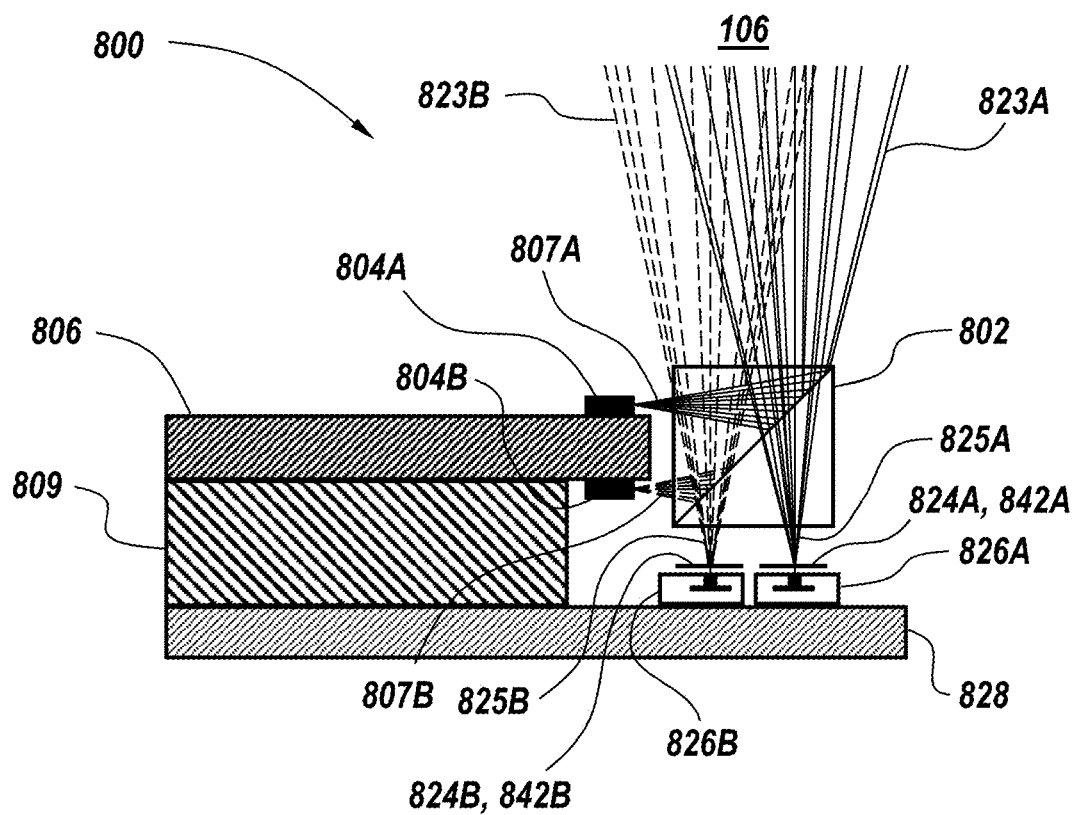
FIG. 14A includes a schematic cross-sectional diagram which illustrates a configuration of a coaxial scanning LiDAR system, according to some exemplary embodiments.
Figure 14B:
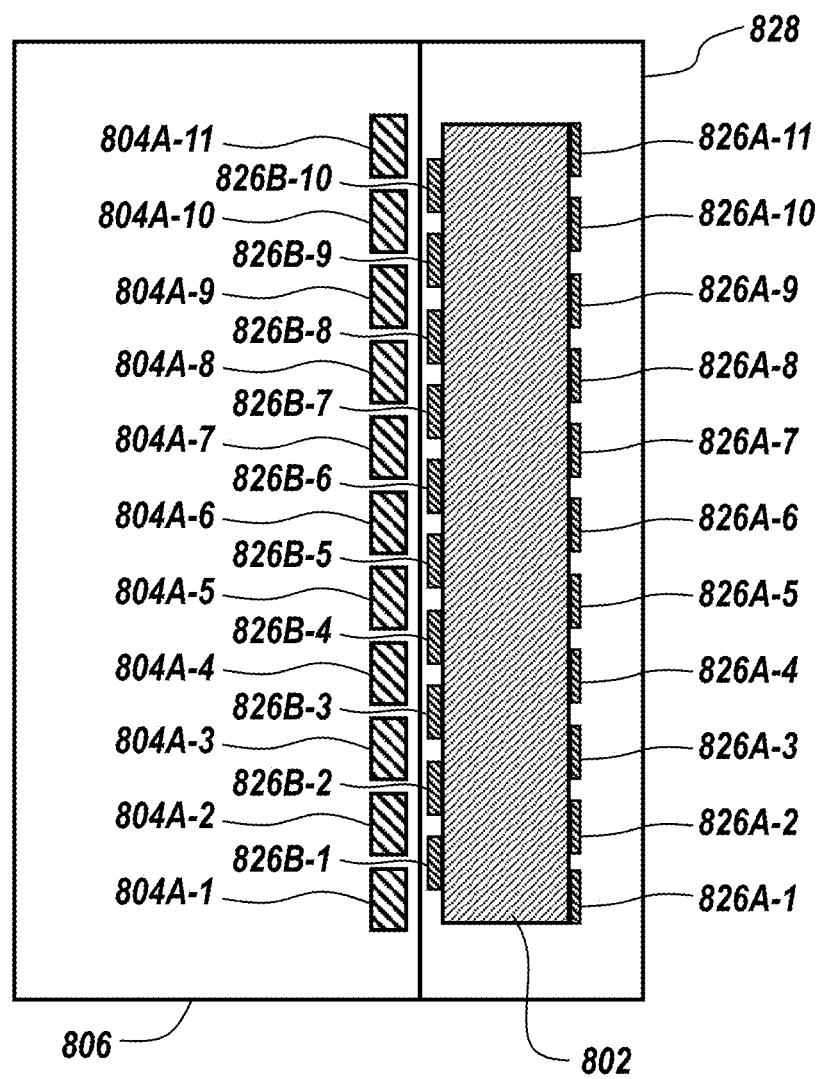
FIG. 14B includes a schematic top view of the coaxial scanning LiDAR system of FIG. 14A, according to some exemplary embodiments.

FIG. 14A includes a schematic cross-sectional diagram which illustrates a configuration of a coaxial scanning LiDAR system 800, according to some exemplary embodiments. FIG. 14B includes a schematic top view of the coaxial scanning LiDAR system 800 of FIG. 14A, according to some exemplary embodiments. Referring to FIGS. 14A and 14B, system 800 includes two laser light sources or arrays of laser light sources 804A, 804B on opposite sides of a first substrate or board 806. Laser light sources 804A-1 through 804A-11 generate output beams of light 807A, which impinge on a beam splitting cube 802, such that output signals 823A are transmitted into region 106. Returning light signals from region 106 are transmitted through beam splitting cube 802, through a slit 842A in mask 824A. It should be noted that beam splitting cube 802 can be a polarizing beam splitting cube. It should also be noted that, as with the embodiments described above, beam splitting cube 802, or polarizing beam splitting cube 802, need not be a cube. It may be a beam splitting plate or polarizing beam splitting plate tilted at an appropriate angle with respect to the optical path(s). Light beams 825A from slit 842A are detected by detectors 826A-1 through 826A-11, which are mounted to the top side or surface of second substrate 828. In some exemplary embodiments, detector(s) or array(s) of detectors 826A and 826B can be SiPM or MPPC detectors.

Similarly, laser light sources 804B-1 through 804B-10 (not seen on back surface of first substrate 806) generate output beams of light 807B, which impinge on a beam splitting cube or plate 802, such that output signals 823B are transmitted into region 106. Returning light signals from region 106 are transmitted through beam splitting cube 802, through a slit 842BA in mask 824B. Light beams 825B from slit 842B are detected by detectors 826B-1 through 826B-10, which are mounted to the top side or surface of second substrate 828.

First substrate 806 and second substrate 828 are mechanically supported and properly located with respect to each other by a mounting/spacing support layer 809. Mounting/spacing support layer 809 can be made of, for example, a layer of inert spacing material, made of, for example, printed circuit board (PCB) material, epoxy, metal, or other similar material. The physical configuration of mounting/spacing support layer 809, i.e., dimensions, location, etc., are selected to provide appropriate support and stability among components such as laser light sources 804A and 804B, beam splitting cube or plate 802, first substrate 806, second substrate 828, masks 824A and 824B, slits 842A and 842B, such that the performance requirements of system 800 are met.

Is should be noted that the exemplary embodiment of FIGS. 14A and 14B includes eleven (11) detectors on the top side of substrate 806 and ten (10) detectors on the bottom side of substrate 806. It will be understood that these quantities are selected as exemplary illustrations only. Other quantities of detectors can be used.

Figure 15A:
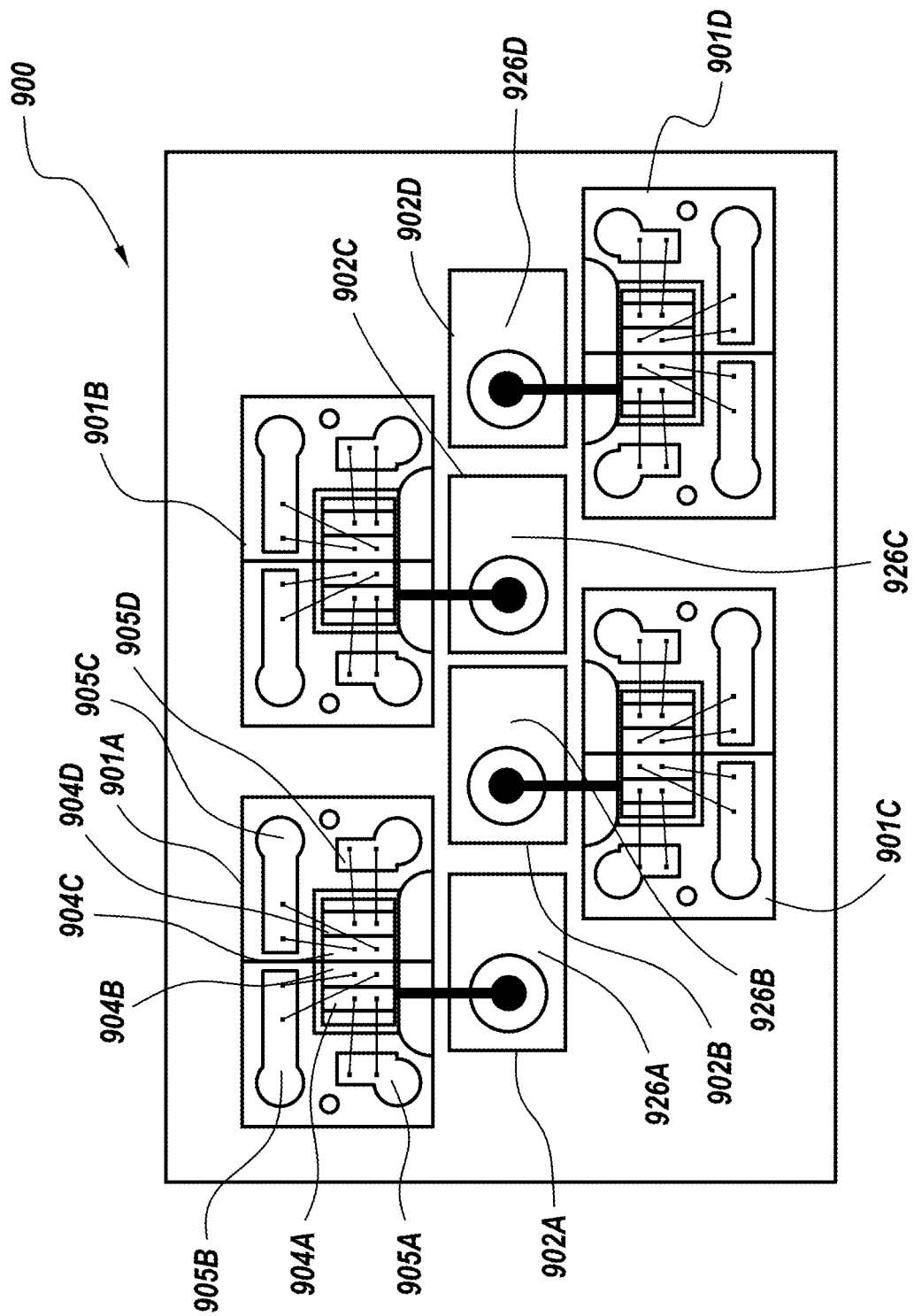
FIGS. 15A and 15B include schematic top views of a portion of a scanning LiDAR system, using multiplexing of lasers in a plurality of multi-laser arrays and a plurality of detectors, according to some exemplary embodiments.
Figure 15B:
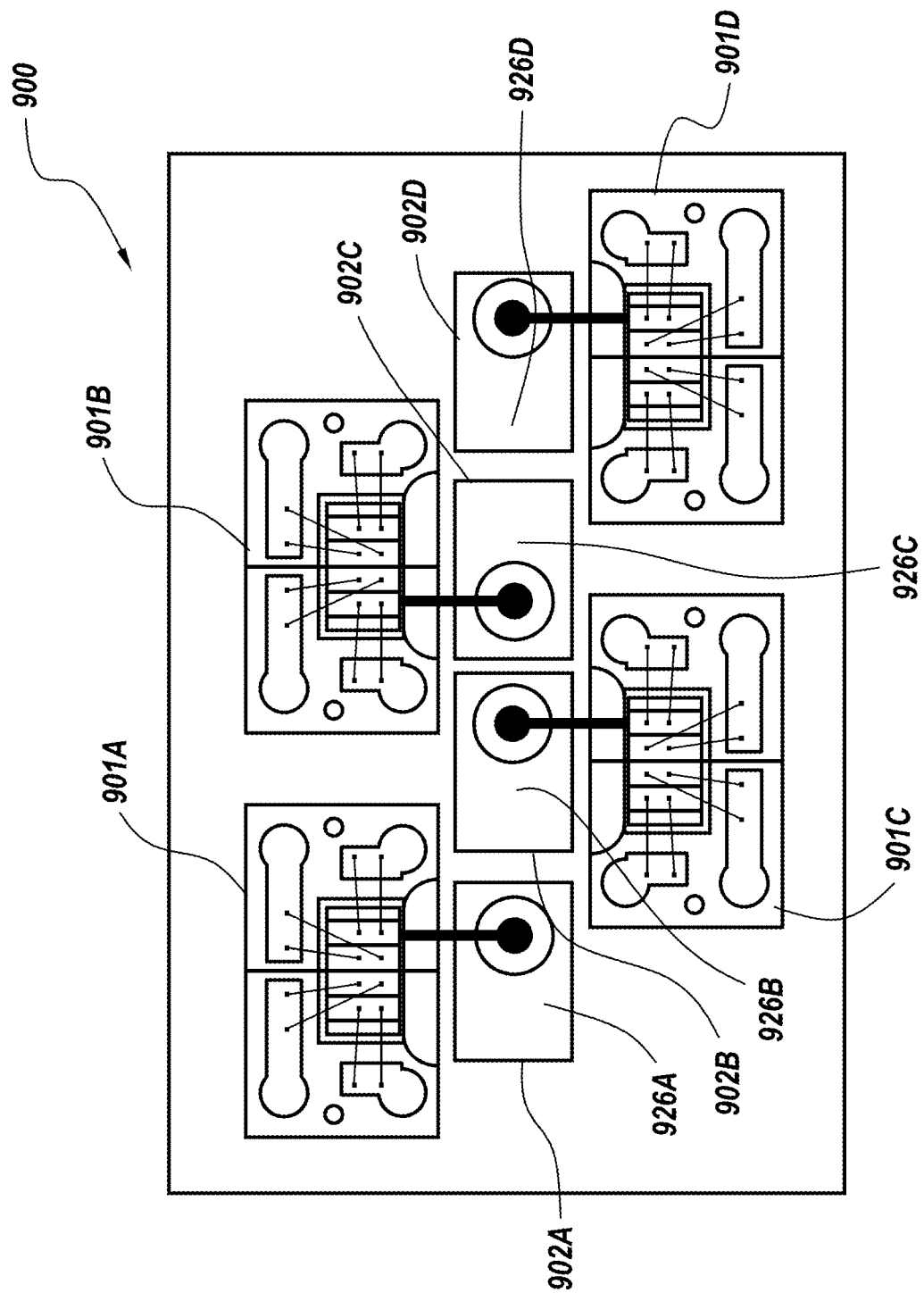

FIGS. 15A and 15B include schematic top views of a portion of a scanning LiDAR system, using multiplexing of lasers in a plurality of multi-laser array devices 901A, 901B, 901C, 901D and a respective plurality of detector arrays 926A, 926B, 926C, 926D, under a respective plurality of beam splitting cubes or plates 902A, 902B, 902C, 902D. In some exemplary embodiments, detector(s) or array(s) of detectors 926A, 926B, 926C, 926D can be SiPM or MPPC detectors. It is noted that, in the exemplary embodiments, all of multi-laser array devices 901A, 901B, 901C, 901D are the same. Accordingly, for ease and clarity of description and for avoidance of unnecessary redundancy, only one of the devices will be described. Multi-laser array device 901A includes multiple, e.g., four (4), laser light sources 904A, 904B, 904C, 904D. The activation of each laser light source 904A, 904B, 904C, 904D is controlled by a respective activation power and timing/control circuit 905A, 905B, 905C, 905D. In some exemplary embodiments, activation of laser light sources 904 is controlled in a time-multiplexed fashion such that only a single laser light source 904 in each multi-laser array device 901 is active at a time. As a result, only a single corresponding detector 926 is actively receiving signal at a time. At the instant illustrated in FIG. 15A, each first laser light source 904A is active, as indicated by the laser light beam output from all four laser light sources 904A. At some instant later in time, as illustrated in FIG. 15B, each fourth laser light source 904D is active, as indicated by the laser light beam output from all four laser light sources 904D. This laser multiplexing approach to activation of the laser light sources is applicable to any of the embodiments described herein.

Figure 16A:
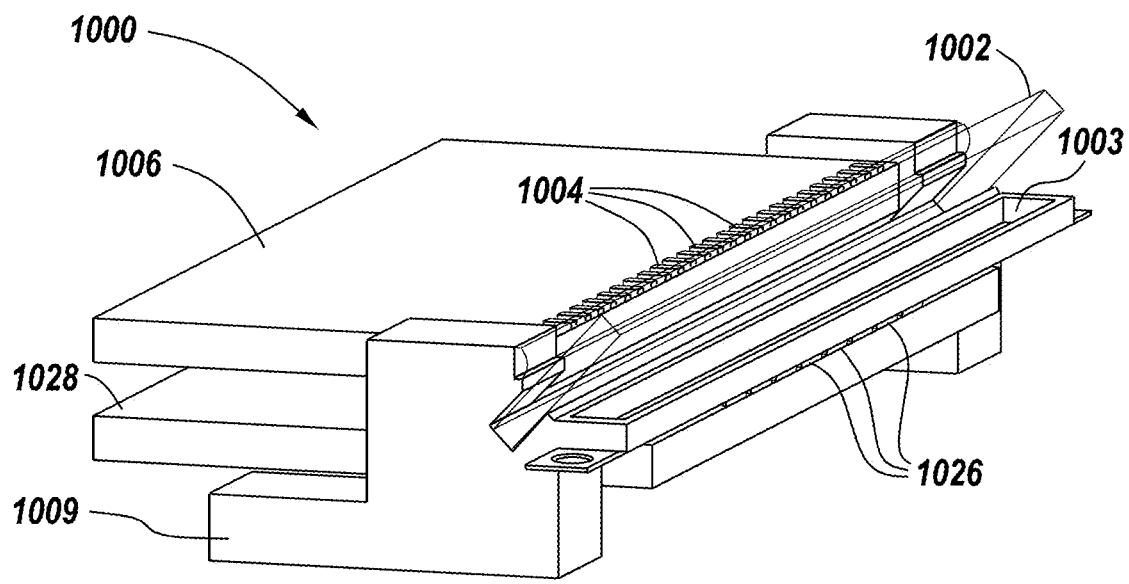
FIG. 16A includes a schematic perspective view which illustrates a configuration of a coaxial scanning LiDAR system 1000, according to some exemplary embodiments.
Figure 16B:
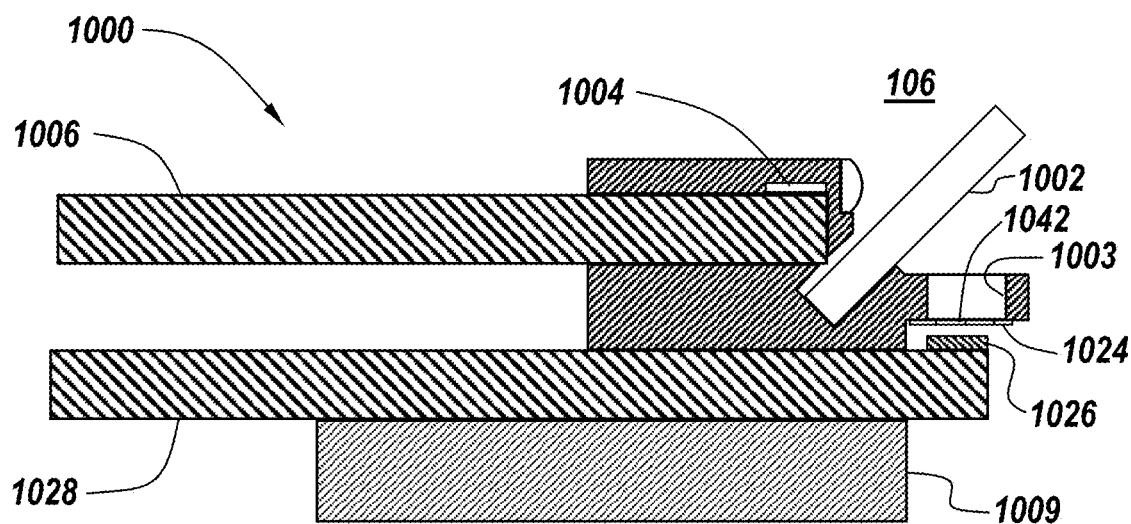
FIG. 16B includes a schematic cross-sectional view of the coaxial scanning LiDAR system of FIG. 16A, according to some exemplary embodiments.
Figure 16C:
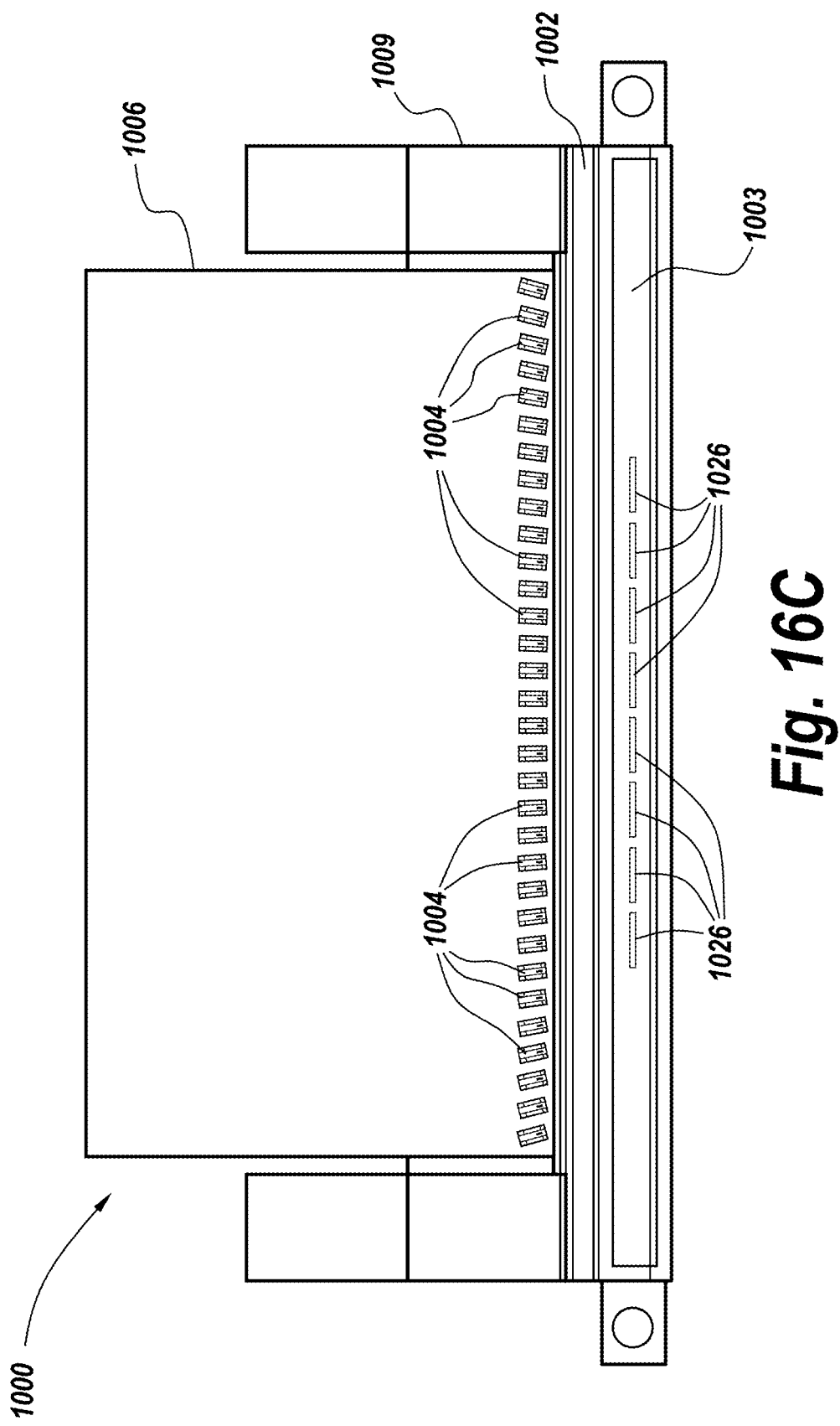
FIG. 16C includes a schematic top view of the coaxial scanning LiDAR system of FIGS. 16A and 16B, according to some exemplary embodiments.

FIG. 16A includes a schematic perspective view which illustrates a configuration of a coaxial scanning LiDAR system 1000, according to some exemplary embodiments. FIG. 16B includes a schematic cross-sectional view of the coaxial scanning LiDAR system 1000 of FIG. 16A, according to some exemplary embodiments. FIG. 16C includes a schematic top view of the coaxial scanning LiDAR system 1000 of FIGS. 16A and 16B, according to some exemplary embodiments. Referring to FIGS. 16A-16C, system 1000 includes laser light sources or arrays of laser light sources 1000 on a first substrate or board 1006. Laser light sources 1004 generate output beams of light which impinge on a beam splitting plate 1002, such that output signals are transmitted into region 106. Returning light signals from region 106 are transmitted through beam splitting cube 1002, through opening 1003 in mechanical support structure 1009, and through a slit 1042 in mask 1024 attached to a surface of mechanical support structure 1009. It should be noted that beam splitting plate 1002 can be a polarizing beam splitting plate. Light beams are detected by detectors 1026, which are mounted to the top side or surface of second substrate 1028. In some exemplary embodiments, detector(s) or array(s) of detectors 1026 can be SiPM or MPPC detectors.

First substrate 1006 and second substrate 1028 are mechanically supported and properly located with respect to each other by a mechanical support structure 1009. Mechanical support structure 1009 can be made of, for example, a layer of inert spacing material, made of, for example, printed circuit board (PCB) material, epoxy, metal, or other similar material. The physical configuration of mechanical support structure 1009, i.e., dimensions, location, etc., are selected to provide appropriate support and stability among components such as laser light sources 1004, beam splitting plate 1002, first substrate 1006, second substrate 1028, mask(s) 1024, slits 1042, such that the performance requirements of system 1000 are met.

Figure 17:
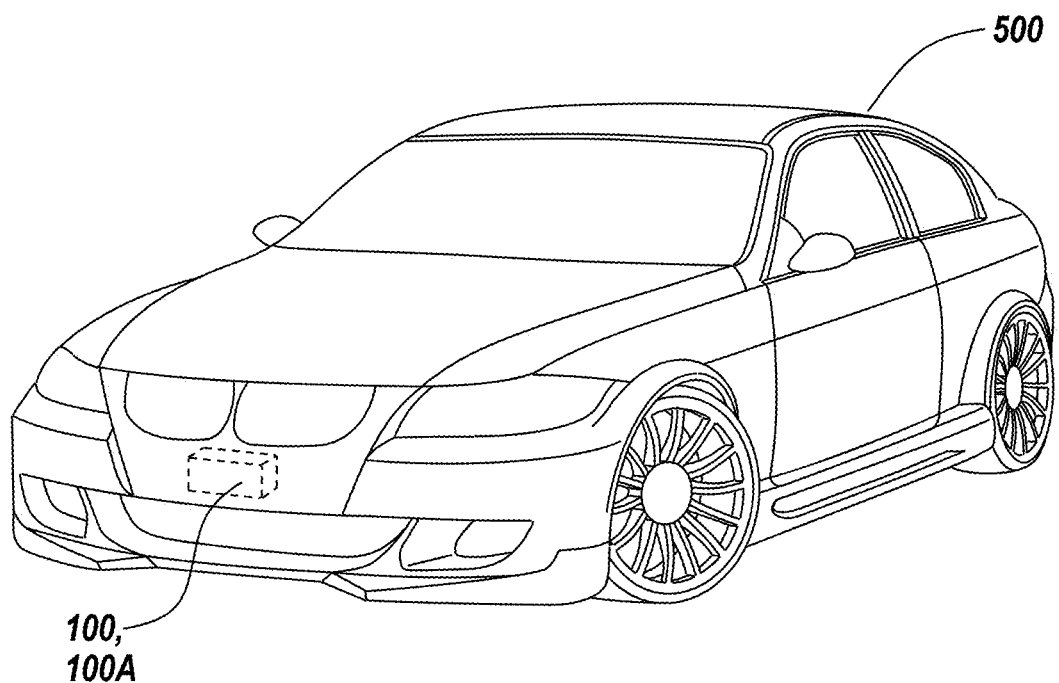
FIG. 17 includes a schematic perspective view of an automobile equipped with one or more LiDAR systems described herein in detail, according to some exemplary embodiments.

FIG. 17 includes a schematic perspective view of an automobile 500, equipped with one or more scanning LiDAR systems 100, 100A, described herein in detail, according to exemplary embodiments. Referring to FIG. 17, it should be noted that, although only a single scanning LiDAR system 100, 100A is illustrated, it will be understood that multiple LiDAR systems 100, 100A according to the exemplary embodiments can be used in automobile 500. Also, for simplicity of illustration, scanning LiDAR system 100, 100A is illustrated as being mounted on or in the front section of automobile 500. It will also be understood that one or more scanning LiDAR systems 100, 100A can be mounted at various locations on automobile 500. Also, it will be understood that LiDAR system 100, 100A can be replaced with any of the LiDAR systems described herein. That is, the description of FIG. 17 is applicable to an automobile equipped with any of the embodiments described herein.

Figure 18:
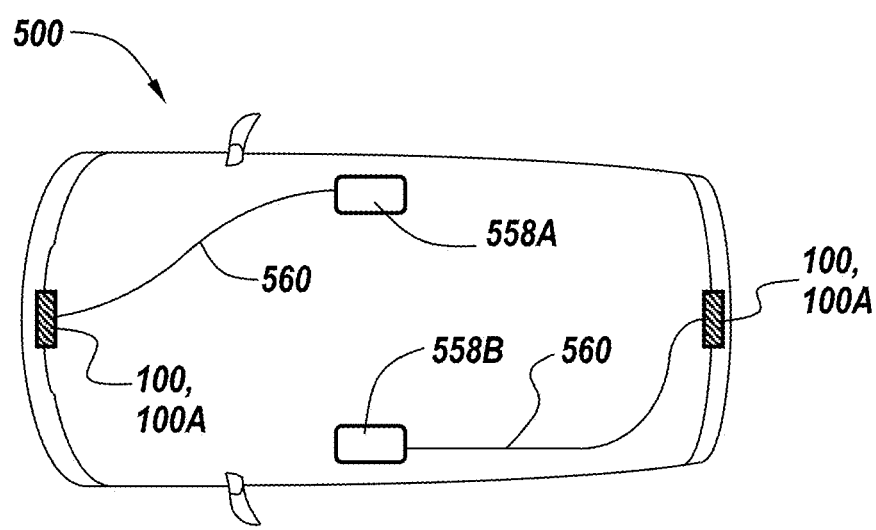
FIG. 18 includes a schematic top view of an automobile equipped with two LiDAR systems as described herein in detail, according to some exemplary embodiments.

FIG. 18 includes a schematic top view of automobile 500 equipped with two scanning LiDAR systems 100, 100A, as described above in detail, according to exemplary embodiments. In the particular embodiments illustrated in FIG. 18, a first LiDAR system 100, 100A is connected via a bus 560, which in some embodiments can be a standard automotive controller area network (CAN) bus, to a first CAN bus electronic control unit (ECU) 558A. Detections generated by the LiDAR processing described herein in detail in LiDAR system 100, 100A can be reported to ECU 558A, which processes the detections and can provide detection alerts via CAN bus 560. Similarly, in some exemplary embodiments, a second LiDAR scanning system 100, 100A is connected via CAN bus 560 to a second CAN bus electronic control unit (ECU) 558B. Detections generated by the LiDAR processing described herein in detail in LiDAR system 100, 100A can be reported to ECU 558B, which processes the detections and can provide detection alerts via CAN bus 560. It should be noted that this configuration is exemplary only, and that many other automobile LiDAR configurations within automobile 500 can be implemented.

For example, a single ECU can be used instead of multiple ECUs. Also, the separate ECUs can be omitted altogether. Also, it will be understood that LiDAR system 100, 100A can be replaced with any of the LiDAR systems described herein. That is, the description of FIG. 17 is applicable to an automobile equipped with any of the embodiments described herein.

It is noted that the present disclosure describes one or more scanning LiDAR systems installed in an automobile. It will be understood that the embodiments of scanning LiDAR systems of the disclosure are applicable to any kind of vehicle, e.g., bus, train, etc. Also, the scanning LiDAR systems of the present disclosure need not be associated with any kind of vehicle.

Direct detection LiDAR systems are characterized by construction and functional simplicity and, unlike the more complex homodyne or heterodyne LiDAR systems, do not utilize frequency translation or down conversion stages, which facilitate signal detection and processing gain advantages. The signal detection and processing gain advantages of homodyne/heterodyne LiDAR systems are enabled by advanced modulation and coding of the transmitted signal combined with sophisticated correlation processing techniques within the LiDAR receiver. Transmit signal modulation and coding, in conjunction with advanced correlation processing techniques, have been utilized within radar systems, from complex military object imaging systems to commercial automotive autonomous cruise control applications. LiDAR systems, with the exception of very advanced measurement requirements, e.g. NASA measurements of $CO_2$ emissions, have not utilized these techniques. However, according to the present disclosure, development of laser transmit signal envelope modulation and quadrature demodulation of the recovered envelope modulation signal has exhibited similar advantages to those associated and achieved via the radar science. Laser transmitter envelope modulation and quadrature demodulation represent a modest increase in complexity of direct detection LiDAR systems with significant benefits in measurement capability and lower operational power by enabling signal processing gain to direct detection LiDAR.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. An optical transceiver device, comprising:
a substrate;
a laser fixed to a first surface of the substrate, the laser generating output light for transmission along a transmission axis into a region;
an optical detection element fixed to a second surface of the substrate opposite the first surface, the optical detection element receiving input light reflected from the region along a reception axis through an opening in the substrate between the first and second surfaces of the substrate; and
a beam splitting device fixed to and in direct contact with the first surface of the substrate at the opening in the substrate, the transmission axis and the reception axis contacting a surface of the beam splitting device, and the transmission axis and the reception axis being substantially parallel to each other where they contact the surface of the beam splitting device.

2. The optical transceiver device of claim 1, wherein the transmission axis and the reception axis are substantially the same axis.

3. The optical transceiver device of claim 1, further comprising a mask having at least one slit aligned with the opening in the substrate, such that the reflected light received by the detection element from the region passes through the slit.

4. The optical transceiver device of claim 3, wherein the mask is formed at the first surface of the substrate.

5. The optical transceiver device of claim 3, wherein the mask is formed at the second surface of the substrate.

6. The optical transceiver device of claim 1, further comprising a bandpass filter, the light returning from the region impinging on the bandpass filter such that the light returning from the region is filtered by the bandpass filter.

7. The optical transceiver device of claim 6, wherein the bandpass filter has a wavelength pass band which drifts with temperature, the bandpass filter being selected such that temperature drift of the pass band of the bandpass filter is determined according to temperature drift of a wavelength of the output light.

8. The optical transceiver device of claim 1, wherein the optical detection element comprises a silicon photomultiplier (SiPM) detector.

9. The optical transceiver device of claim 1, wherein the optical detection element comprises a multi-pixel photon counter (MPPC) detector.

10. The optical transceiver device of claim 9, further comprising a mask having at least one slit aligned with the opening in the substrate, such that the reflected light received by the detector from the region passes through the slit before it reaches the detector.

11. The optical transceiver device of claim 10, wherein the mask is formed at the first surface of the substrate.

12. The optical transceiver device of claim 10, wherein the mask is formed at the second surface of the substrate.

13. The optical transceiver device of claim 1, further comprising a polarizing beam splitter in an optical path between the laser and the detector, both the output light and the input light at least partially passing through the polarizing beam splitter.

14. The optical transceiver device of claim 1, further comprising a polarizing beam splitter in an optical path between the laser and the detector, at least one of the output light and the input light at least partially passing through the polarizing beam splitter.

15. The optical transceiver device of claim 1, further comprising a plurality of lasers fixed to a first surface of the substrate, the output light including a respective plurality of light beams generated by the plurality of lasers.

16. The optical transceiver device of claim 15, further comprising a scanning device for scanning the plurality of light beams over the region.

17. The optical transceiver device of claim 16, wherein the scanning device comprises a scanning mirror.

18. The optical transceiver device of claim 17, wherein the scanning mirror is a micro-electromechanical system (MEMS) scanning mirror.

19. The optical transceiver device of claim 1, wherein the optical detection element comprises an array of optical detectors.

20. The optical transceiver device of claim 19, wherein the optical detectors comprise a silicon photomultiplier (SiPM).

21. The optical transceiver device of claim 19, wherein the optical detectors comprise a multi-pixel photon counter (MPPC).

22. The optical transceiver device of claim 19, wherein the array of optical detectors is a two-dimensional array.

23. The optical transceiver device of claim 1, wherein the optical transceiver device is part of an automotive LiDAR detection system.

24. The optical transceiver device of claim 23, wherein the LiDAR detection system is a coaxial system.

\* \* \* \* \*